US012641539B2

(12) United States Patent
Deogun et al.

(10) Patent No.: US 12,641,539 B2
(45) Date of Patent: May 26, 2026

(54) ADJUSTMENT OF AN ENCODING TIMING OR A DECODING TIMING

(71) Applicant: QUALCOMM Incorporated, San Diego, CA (US)

(72) Inventors: Pravjyot Singh Deogun, Bengaluru (IN); Pradeep Ganapathy, San Diego, CA (US); Carlos Marcelo Dias Pazos, Carlsbad, CA (US); Sanjeev Mittal, San Diego, CA (US); Min Wang, San Diego, CA (US); Vikram Singh, San Diego, CA (US); Manjunatha Kantharaju, Bangalore (IN); Shankar Ganesh Lakshmanaswamy, Bangalore (IN); Sumanth Kumar Kota, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/557,819

(22) PCT Filed: Nov. 2, 2021

(86) PCT No.: PCT/US2021/072179
§ 371 (c)(1),
(2) Date: Oct. 27, 2023

(87) PCT Pub. No.: WO2023/009169
PCT Pub. Date: Feb. 2, 2023

(65) Prior Publication Data
US 2024/0214929 A1     Jun. 27, 2024

(30) Foreign Application Priority Data
Jul. 30, 2021    (IN) .............................. 202141034354

(51) Int. Cl.
| | | |
|---|---|---|
| *H04W 52/02* | (2009.01) | |
| *H04W 72/11* | (2023.01) | |
| *H04W 76/28* | (2018.01) | |

(52) U.S. Cl.
CPC ....... *H04W 52/0216* (2013.01); *H04W 76/28* (2018.02); *H04W 72/11* (2023.01)

(58) Field of Classification Search
CPC . H04W 52/0216; H04W 76/28; H04W 72/11; H04W 28/0221; H04L 65/60; H04L 65/65; H04L 65/70
See application file for complete search history.

(56) References Cited

U.S. PATENT DOCUMENTS

| | | | | | |
|---|---|---|---|---|---|
| 10,869,357 | B2 * | 12/2020 | Lee | ........................ | H04W 72/23 |
| 2009/0203376 | A1 * | 8/2009 | Sambhwani | ...... | H04W 52/0216 |
| | | | | | 455/434 |

(Continued)

OTHER PUBLICATIONS

International Search Report and Written Opinion—PCT/US2021/072179—ISA/EPO—Apr. 20, 2022.

*Primary Examiner* — Brandon J Miller
(74) *Attorney, Agent, or Firm* — Harrity & Harrity, LLP \ Qualcomm

(57) ABSTRACT

This disclosure provides systems, methods, and apparatuses for adjusting an encoding timing or a decoding timing in a manner that minimizes disruption of ongoing uplink or downlink traffic. Some aspects more specifically relate to decoupling adjustment of the encoding timing and adjustment the decoding timing to enable independent adjustment of the encoding timing or the decoding timing. In some aspects, a user equipment (UE) may perform adjustment of the encoding timing, relative to an active time indicated by a discontinuous reception (DRX) configuration, at a time at which uplink traffic is absent. Additionally, or alternatively, the UE may perform adjustment of the decoding timing, (Continued)

300 → relative to an active time indicated by a DRX configuration, at a time at which downlink traffic is absent. Accordingly, upon receiving a DRX configuration, the UE may wait until a period in which uplink traffic or downlink traffic is absent to perform a timing adjustment.

30 Claims, 19 Drawing Sheets

(56) References Cited

U.S. PATENT DOCUMENTS

| | | | |
|---|---|---|---|
| 2013/0064151 A1* | 3/2013 | Mujtaba | H04L 43/0823 |
| | | | 370/311 |
| 2014/0247742 A1 | 9/2014 | Lee et al. | |
| 2016/0057718 A1* | 2/2016 | Sorrentino | H04W 56/002 |
| | | | 370/350 |
| 2017/0019948 A1 | 1/2017 | Baghel et al. | |
| 2017/0070909 A1 | 3/2017 | Kim et al. | |
| 2019/0037498 A1* | 1/2019 | Tseng | H04W 72/046 |

* cited by examiner

Figure 5:
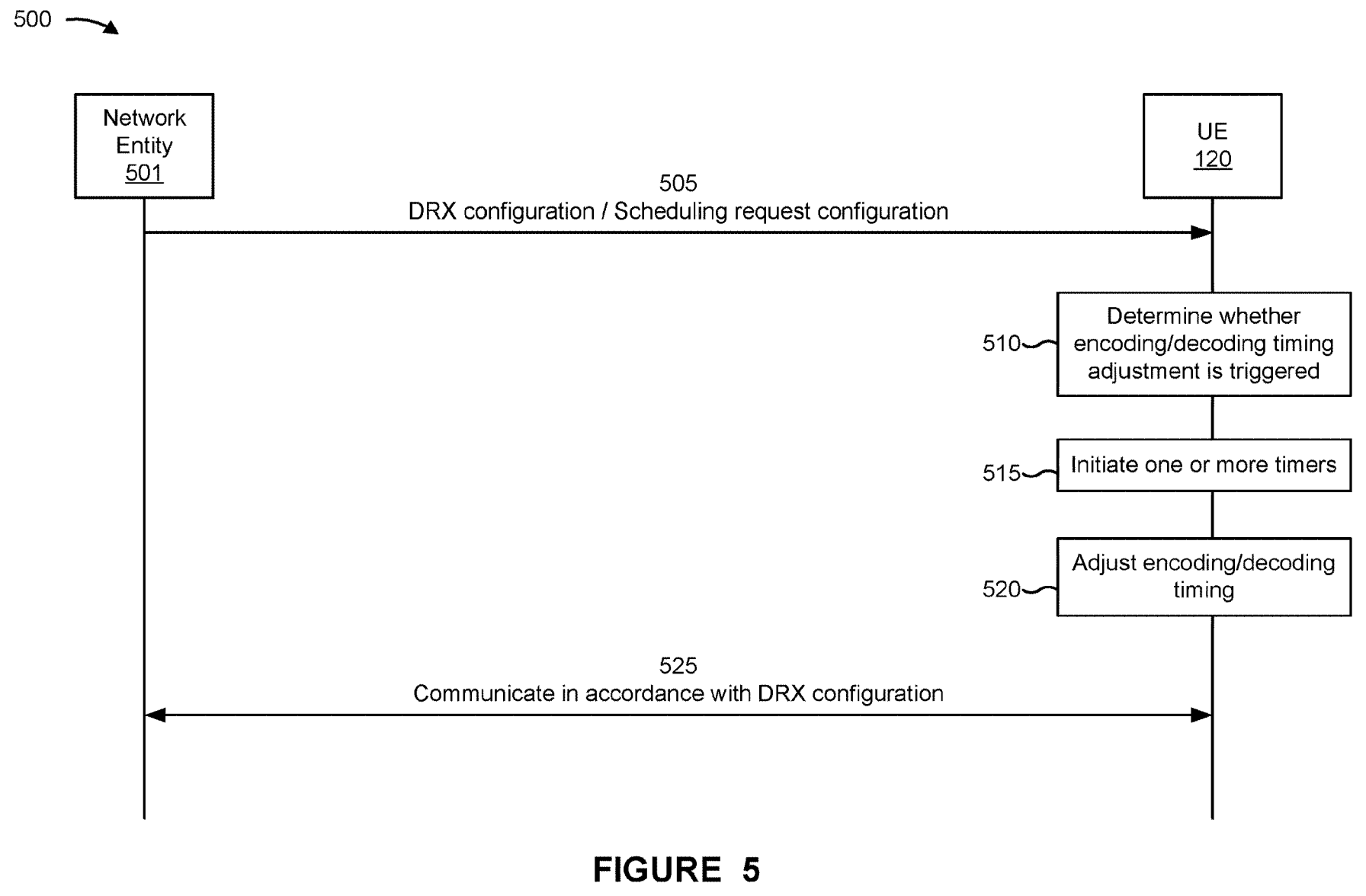

Network
Entity
501

UE
120

505
DRX configuration / Scheduling request configuration

510 — Determine whether encoding/decoding timing adjustment is triggered

515 — Initiate one or more timers

520 — Adjust encoding/decoding timing

525
Communicate in accordance with DRX configuration

602 — Decoding timing adjustment triggered

606 — Perform decoding timing adjustment

UE 120

Time

Downlink

Talkspurt-1    Talkspurt-2    Talkspurt-3    604    Talkspurt-4

Time

Receive, from a network entity, a DRX configuration that indicates an active time for the UE Selectively adjust, at a particular time according to when the DRX configuration is received, at least one of an encoding timing or a decoding timing relative to the active time indicated by the DRX configuration

910

920

900

ADJUSTMENT OF AN ENCODING TIMING OR A DECODING TIMING

CROSS-REFERENCE TO RELATED APPLICATION APPLICATIONS

This Patent Application is a 371 national stage of PCT Application No. PCT/US2021/072179 filed on Nov. 2, 2021, entitled "ADJUSTMENT OF AN ENCODING TIMING OR A DECODING TIMING," which claims priority to India patent application No. 202141034354, filed on Jul. 30, 2021, entitled "ADJUSTMENT OF AN ENCODING TIMING OR A DECODING TIMING," and assigned to the assignee hereof. The disclosures of the prior Applications are considered part of and are incorporated by reference into this Patent Application.

TECHNICAL FIELD

Aspects of the present disclosure relate generally to wireless communication and to techniques for adjustment of an encoding timing or a decoding timing.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving, from a network entity, a discontinuous reception (DRX) configuration that indicates an active time for the UE, and selectively adjusting, at a particular time according to when the DRX configuration is received, at least one of an encoding timing or a decoding timing relative to the active time indicated by the DRX configuration.

In some implementations, the encoding timing is associated with one or more of encoding of audio or video packets or real-time transport protocol (RTP) encoding, and the decoding timing is associated with one or more of decoding of audio or video packets or RTP decoding.

In some implementations, selectively adjusting at least one of the encoding timing or the decoding timing includes adjusting at least one of the encoding timing or the decoding timing if a DRX cycle length indicated by the DRX configuration is less than a threshold, and a change to the active time, relative to a previous active time indicated by a previous DRX configuration for the UE, is greater than a threshold.

In some implementations, selectively adjusting at least one of the encoding timing or the decoding timing includes at least one of: adjusting, based on the DRX configuration satisfying one or more conditions for adjusting the encoding timing, the encoding timing at a time at which uplink traffic is absent, or adjusting, based on the DRX configuration satisfying one or more conditions for adjusting the decoding timing, the decoding timing at a time at which downlink traffic is absent.

In some implementations, the uplink traffic is uplink streaming traffic and the downlink traffic is downlink streaming traffic.

In some implementations, the uplink traffic is an uplink talkspurt and the downlink traffic is a downlink talkspurt.

In some implementations, the method may include initiating, based on the DRX configuration satisfying one or more conditions for adjusting at least one of the encoding timing or the decoding timing, one or more of a timer for adjustment of the encoding timing, a timer for adjustment of the decoding timing, or a timer for adjustment of the encoding timing and the decoding timing.

In some implementations, based on the DRX configuration satisfying one or more conditions for adjusting the decoding timing, the decoding timing is adjusted prior to expiration of a timer for adjusting the decoding timing and at a time at which downlink traffic is absent.

In some implementations, the method may include receiving a subsequent DRX configuration for the UE prior to expiration of a timer for adjustment of the decoding timing.

In some implementations, the method may include terminating the timer for adjustment of the decoding timing and initiating a timer for adjustment of the encoding timing and the decoding timing if the subsequent DRX configuration satisfies one or more conditions for adjusting the encoding timing and the decoding timing.

In some implementations, the method may include terminating the timer for adjustment of the decoding timing if the subsequent DRX configuration does not satisfy one or more conditions for adjusting the decoding timing.

In some implementations, the method may include reinitiating the timer for adjustment of the decoding timing if the subsequent DRX configuration satisfies one or more conditions for adjusting the decoding timing.

In some implementations, based on the DRX configuration satisfying one or more conditions for adjusting the decoding timing, the decoding timing is adjusted upon expiration of a timer for adjustment of the decoding timing if downlink traffic is present for a duration of the timer.

In some implementations, based on the DRX configuration satisfying one or more conditions for adjusting the encoding timing, the encoding timing is adjusted prior to expiration of a timer for adjusting the encoding timing and at a time at which uplink traffic is absent.

In some implementations, the method may include receiving a subsequent DRX configuration for the UE prior to expiration of a timer for adjustment of the encoding timing.

In some implementations, the method may include terminating the timer for adjustment of the encoding timing and initiating a timer for adjustment of the encoding timing and the decoding timing if the subsequent DRX configuration satisfies one or more conditions for adjusting the encoding timing and the decoding timing.

In some implementations, the method may include terminating the timer for adjustment of the encoding timing if the subsequent DRX configuration does not satisfy one or more conditions for adjusting the encoding timing.

In some implementations, the method may include reinitiating the timer for adjustment of the encoding timing if the subsequent DRX configuration satisfies one or more conditions for adjusting the encoding timing.

In some implementations, based on the DRX configuration satisfying one or more conditions for adjusting the encoding timing, the encoding timing is adjusted upon expiration of a timer for adjustment of the encoding timing if uplink traffic is present for a duration of the timer.

In some implementations, based on the DRX configuration satisfying one or more conditions for adjusting the encoding timing and the decoding timing, the encoding timing and the decoding timing are adjusted prior to expiration of a timer for adjusting the encoding timing and the decoding timing and at a time at which uplink traffic and downlink traffic are absent.

In some implementations, the method may include receiving a subsequent DRX configuration for the UE prior to expiration of a timer for adjustment of the encoding timing and the decoding timing.

In some implementations, the method may include terminating the timer for adjustment of the encoding timing and the decoding timing and initiating a timer for adjustment of the encoding timing or a timer for adjustment of the decoding timing if the subsequent DRX configuration satisfies one or more conditions for adjusting only one of the encoding timing or the decoding timing.

In some implementations, the method may include reinitiating the timer for adjustment of the encoding timing and the decoding timing if the subsequent DRX configuration satisfies one or more conditions for adjusting the encoding timing and the decoding timing.

In some implementations, based on the DRX configuration satisfying one or more conditions for adjusting the encoding timing and the decoding timing, the encoding timing and the decoding timing are adjusted upon expiration of a timer for adjustment of the encoding timing and the decoding timing if at least one of uplink traffic or downlink traffic is present for a duration of the timer.

In some implementations, the method may include receiving an indication that the DRX configuration is to be released; and refraining from adjusting the encoding timing and the decoding timing if the DRX configuration is released.

In some implementations, selectively adjusting at least one of the encoding timing or the decoding timing includes refraining from adjusting at least one of the encoding timing or the decoding timing if a DRX cycle length indicated by the DRX configuration is greater than a threshold.

In some implementations, selectively adjusting at least one of the encoding timing or the decoding timing includes refraining from adjusting at least one of the encoding timing or the decoding timing if a change of the active time, relative to a previous active time indicated by a previous DRX configuration for the UE, is less than a threshold.

In some implementations, the active time is indicated by the DRX configuration in conjunction with one or more of a scheduling request configuration for the UE, a semi-persistent scheduling configuration for the UE, a configured grant configuration for the UE, or one or more configured uplink grants for the UE.

Another innovative aspect of the subject matter described in this disclosure can be implemented in an apparatus of a UE for wireless communication. The apparatus may include an interface configured to obtain, from a network entity, a DRX configuration that indicates an active time for the UE. The apparatus may include a processing system configured to selectively adjust, at a particular time according to when the DRX configuration is obtained, at least one of an encoding timing or a decoding timing relative to the active time indicated by the DRX configuration.

In some aspects, the apparatus of the UE, such as the processing system of the apparatus or one or more interfaces of the apparatus, may be configured to perform one or more operations of the method of wireless communication performed by the apparatus of the UE.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a network entity, a DRX configuration that indicates an active time for the UE, and selectively adjust, at a particular time according to when the DRX configuration is received, at least one of an encoding timing or a decoding timing relative to the active time indicated by the DRX configuration.

In some aspects, the one or more instructions of the non-transitory computer-readable medium, when executed by the one or more processors of the UE, may cause the one or more processors to perform one or more operations of the method of wireless communication performed by the apparatus of the UE.

Another innovative aspect of the subject matter described in this disclosure can be implemented in an apparatus for wireless communication. The apparatus may include means for receiving, from a network entity, a DRX configuration that indicates an active time for the apparatus, and means for selectively adjusting, at a particular time according to when the DRX configuration is received, at least one of an encoding timing or a decoding timing relative to the active time indicated by the DRX configuration.

In some aspects, the apparatus may including means for performing one or more operations of the method of wireless communication performed by the apparatus of the UE.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims.

Note that the relative dimensions of the following figures may not be drawn to scale.

BRIEF DESCRIPTION OF THE DRAWINGS

FIG. 4 is a diagram illustrating an example of encoding timing and decoding timing.

FIG. 5 is a diagram illustrating an example associated with adjustment of an encoding timing or a decoding timing.

Like reference numbers and designations in the various drawings indicate like elements.

DETAILED DESCRIPTION

Figure 1:
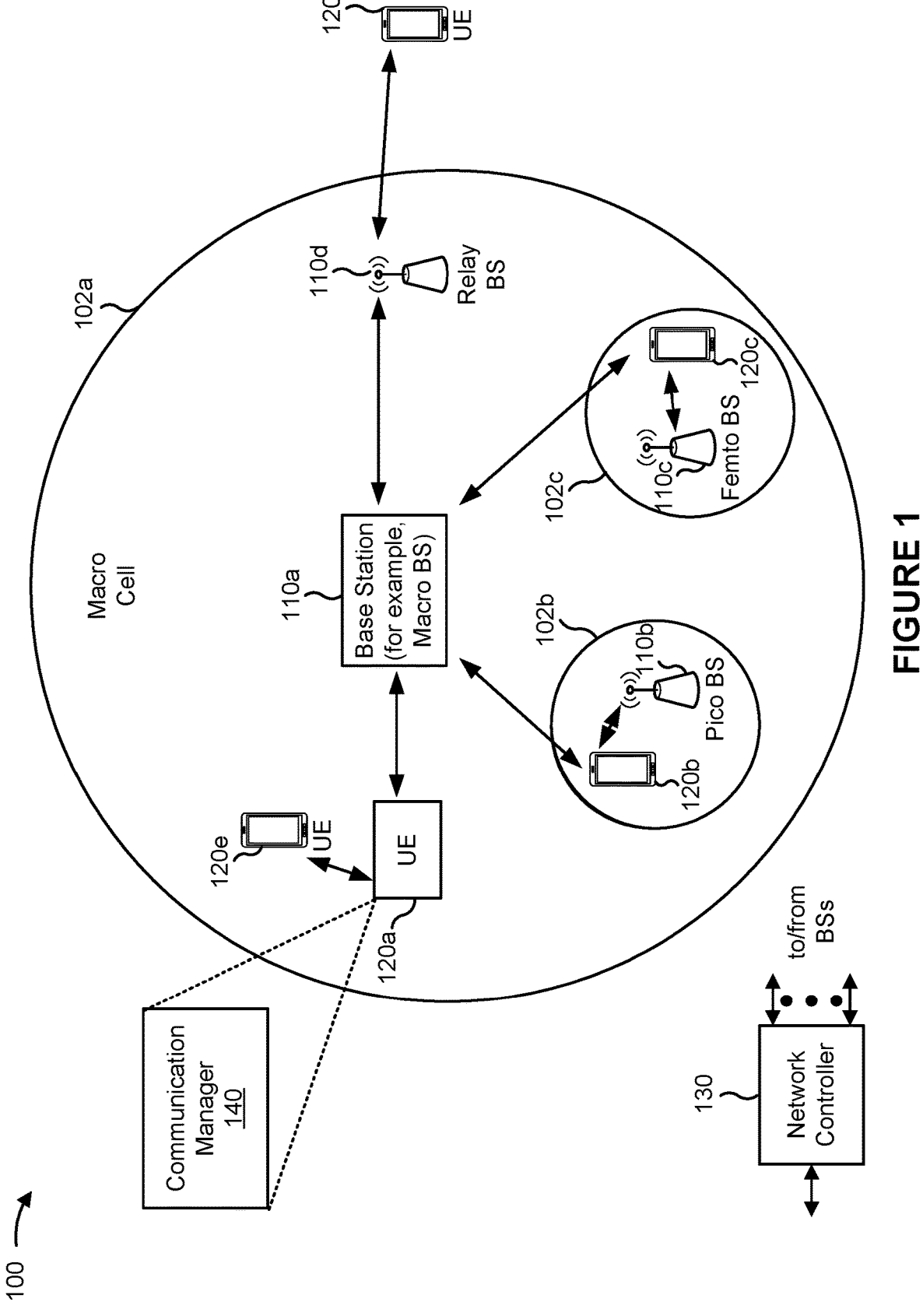
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband- CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G technology, 4G technology, 5G technology, or further implementations thereof.

A user equipment (UE) may receive data from a wireless communication network on a downlink channel, and may provide data to the wireless communication network on an uplink channel. Monitoring the downlink channel, and transmitting signals to provide the data on the uplink channel, may be battery-intensive for the UE. Therefore, the UE may operate in a mode to reduce an amount of time during which the UE is monitoring channels or transmitting signals.

One such mode is known as a discontinuous reception (DRX) mode. When operating in a DRX mode, the UE may transition between an active state (that is, an awake period where the UE wakes up to determine if data is available for the UE) and a sleep or idle state (that is, where the UE shuts down various hardware or processes to conserve power). For example, the UE may monitor a downlink channel or transmit data on an uplink channel in the active state (that is, during an active time or active period) of the UE, and the UE may not monitor the downlink channel or transmit data on the uplink channel in the sleep state (that is, during a sleep period) of the UE. The active state and the sleep state may be cyclical, and a time period of an active state followed by a sleep state may be referred to herein as a DRX cycle length. In some cases, the DRX mode may be a connected-mode DRX (C-DRX) mode in which the UE powers down a portion of the UE's radio components, but maintains some degree of access stratum context with a base station (such as, at least some degree of synchronization or timing, among other examples). Operation in the C-DRX mode may conserve power consumption of the UE, thereby improving battery life.

To further improve power saving of the UE (for example, of the UE's modem) when C-DRX is configured for the UE, the processing of different internet protocol (IP) multimedia subsystem (IMS) modules of the UE (for example, audio packet encoding and decoding, real-time transport protocol (RTP) encoding and decoding, or de-jitter buffer processing) may be performed near an active time of the UE. That is, a timeline for encoding for uplink communication may be based on a scheduling request occasion associated with the active time or a start of a timer for the active time. Similarly, a timeline for decoding for downlink communication may be based on an end of the timer for the active time.

These timelines should be updated when the UE receives a new DRX configuration from a network. Adjustment of the timing of encoding or decoding may be referred to as a re-synchronization (or re-sync) operation. However, updating of the timeline for processing of audio packets or the timeline for RTP processing may cause interruption and the loss of speech samples if the update is performed during an active uplink talkspurt or an active downlink talkspurt. "Talkspurt" may refer to a continuous segment of speech between silent intervals in a digital voice call. As a result, perceived audio quality may be degraded, particularly when DRX reconfiguration is frequent. In high mobility scenarios, the loss of audio quality may be significant because a UE may frequently change cells resulting in frequent DRX reconfiguration by the network.

Various aspects of the present disclosure relate generally to adjusting an encoding timing or a decoding timing in a manner that minimizes disruption of ongoing uplink or downlink traffic. Some aspects more specifically relate to decoupling adjustment of the encoding timing (for example, a re-sync operation of a transmission path of the UE) and adjustment the decoding timing (for example, a re-sync operation of a reception path of the UE) to enable independent adjustment of the encoding timing or the decoding timing. In some aspects, the UE may perform adjustment of the encoding timing, relative to an active time indicated by a DRX configuration, at a time at which uplink traffic is absent (for example, at a time when a silence period is ongoing or detected in audio uplink transmission). In some aspects, the UE may perform adjustment of the decoding timing, relative to an active time indicated by a DRX configuration, at a time at which downlink traffic is absent (for example, at a time when a silence period is ongoing or detected in audio downlink reception). In some aspects, the UE may perform adjustment of the encoding timing and the decoding timing, relative to an active time indicated by a DRX configuration, at a time at which uplink traffic and downlink traffic are absent (for example, at a time when a silence period is ongoing or detected in both audio uplink transmission and audio downlink reception). Accordingly, rather than naively and immediately performing encoding or decoding timing adjustment upon receiving a DRX configuration, the UE may wait until a period in which uplink traffic or downlink traffic is absent to perform the timing adjustment.

Particular implementations of the subject matter described in this disclosure can be implemented to realize one or more of the following potential advantages. In some examples, the described techniques may be used to avoid or minimize interruption to voice calls, video streaming, or other streaming traffic. That is, the quality of voice communication, video communication, or other similar communication at the UE may be improved by employing the techniques described herein. Moreover, the described techniques may improve the performance of communications of the UE, particularly in high mobility scenarios or other scenarios in which DRX reconfiguration is frequent. Also, the described techniques may enable performance of a re-sync operation as soon as possible after an update of a DRX configuration, which may improve overall power consumption of the UE.

FIG. 1 is a diagram illustrating an example of a wireless network 100. The wireless network 100 may be or may include elements of a 5G (for example, NR) network or a 4G (for example, LTE) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL)

station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network entity, a DRX configuration that indicates an active time for the UE; and selectively adjust, at a particular time according to when the DRX configuration is received, at least one of an encoding timing or a decoding timing relative to the active time indicated by the DRX configuration. Additionally, or alternatively, the communication manager 140 may perform one or more other operations described herein.

Figure 2:
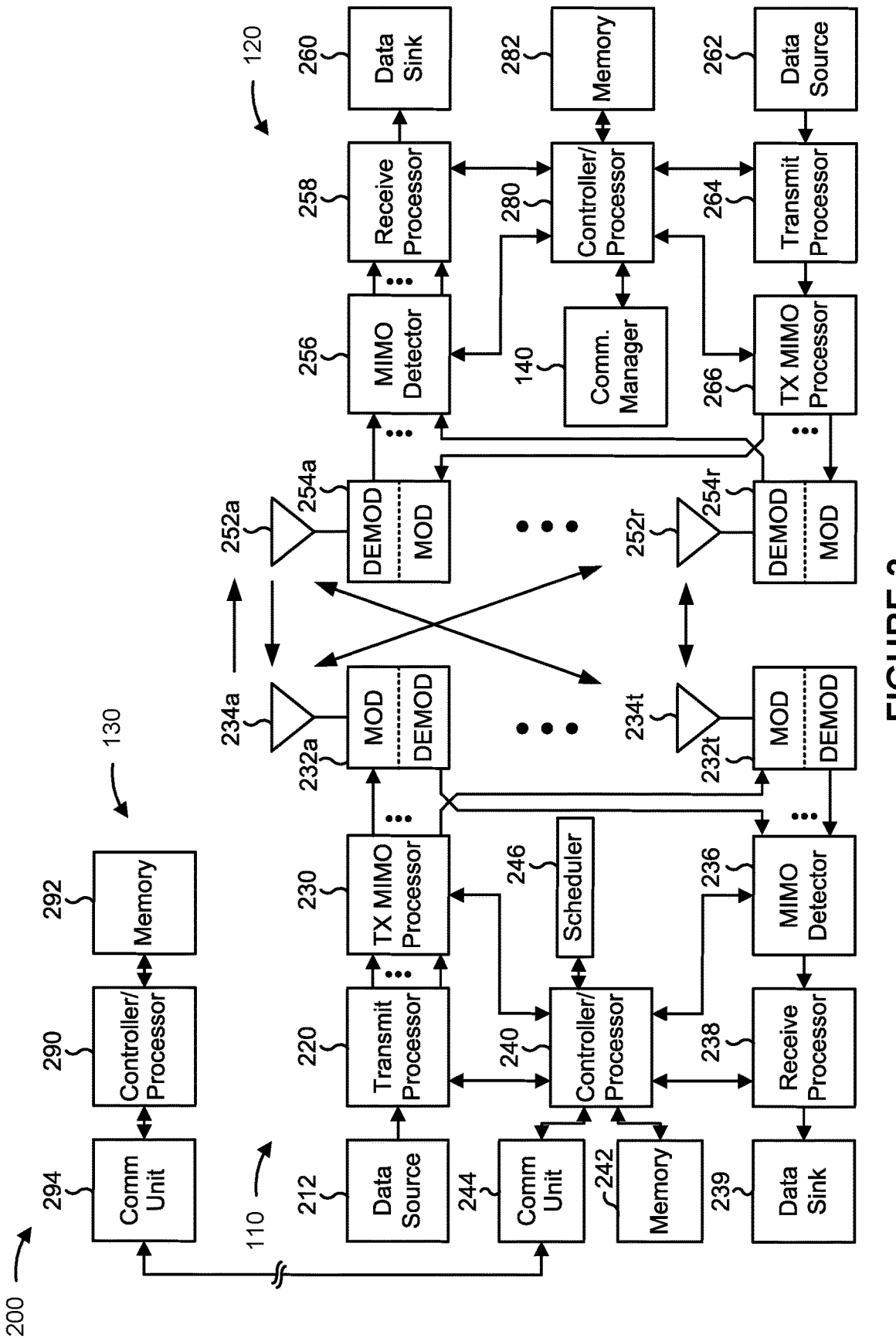
FIG. 2 is a diagram illustrating an example of a base station (BS) in communication with a user equipment (UE) in a wireless network.

FIG. 2 is a diagram illustrating an example 200 of a base station (BS) 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with adjustment of an encoding timing or a decoding timing, as described in more detail elsewhere herein. For example, the controller/processor 240 of the base station 110, the controller/processor 280 of the UE 120, or any other component(s) (or combinations of components) of FIG. 2 may perform or direct operations of, for example, process 900 of FIG. 9, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, or other processes as described herein. In some examples, executing instructions may include running the instructions, converting the instructions, compiling the instructions, or interpreting the instructions.

In some aspects, the UE 120 includes means for receiving, from a network entity, a DRX configuration that indicates an active time for the UE; or means for selectively adjusting, at a particular time according to when the DRX configuration is received, at least one of an encoding timing or a decoding timing relative to the active time indicated by the DRX configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
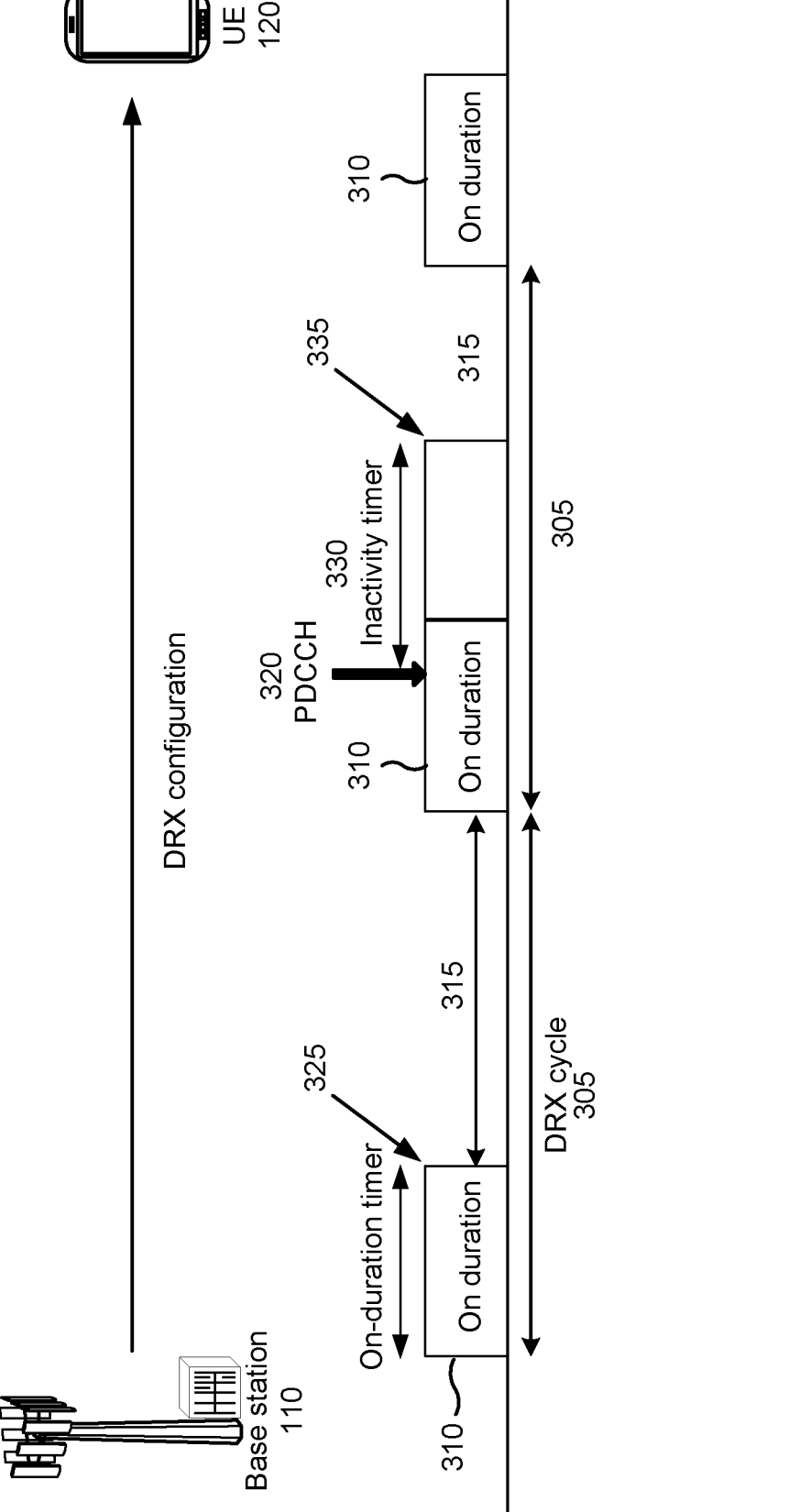
FIG. 3 is a diagram illustrating an example of a discontinuous reception (DRX) configuration.

FIG. 3 is a diagram illustrating an example 300 of a DRX configuration. As shown in FIG. 3, a base station 110 may transmit a DRX configuration to a UE 120 to configure a DRX cycle 305 for the UE 120. The base station 110 and the UE 120 may be an example of the base station 110 and the UE 120 depicted and described in FIGS. 1 and 2. A DRX cycle 305 may include a DRX on duration 310 (for example, during which a UE 120 is awake or in an active state) and an opportunity to enter a DRX sleep state 315. As used herein, the time during which the UE 120 is configured to be in an active state during the DRX on duration 310 may be referred to as an active time, and the time during which the UE 120 is configured to be in the DRX sleep state 315 may be referred to as an inactive time. As described herein, the UE 120 may monitor a physical downlink control channel (PDCCH) during the active time, and may refrain from monitoring the PDCCH during the inactive time.

During the DRX on duration 310 (for example, the active time), the UE 120 may monitor a downlink control channel (for example, a PDCCH), as shown by reference number 320. For example, the UE 120 may monitor the PDCCH for downlink control information (DCI) pertaining to the UE 120. If the UE 120 does not detect or successfully decode any PDCCH communications intended for the UE 120 during the DRX on duration 310, then the UE 120 may enter the sleep state 315 (for example, for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects or successfully decodes a PDCCH communication intended for the UE 120, then the UE 120 may remain in an active state (for example, awake) for the duration of a DRX inactivity timer 330 (for example, which may extend the active time). The UE 120 may start the DRX inactivity timer 330 at a time at which the PDCCH communication is received (for example, in a transmission time interval (TTI) in which the PDCCH communication is received, such as a slot or a subframe). The UE 120 may remain in the active state until the DRX inactivity timer 330 expires, at which time the UE 120 may enter the sleep state 315 (for example, for the inactive time), as shown by reference number 335. During the duration of the DRX inactivity timer 330, the UE 120 may continue to monitor for PDCCH communications, may obtain a downlink data communication (for example, on a downlink data channel, such as a physical downlink shared channel (PDSCH)) scheduled by the PDCCH communication, or may prepare or transmit an uplink communication (for example, on a physical uplink shared channel (PUSCH)) scheduled by the PDCCH communication. The UE 120 may restart the DRX inactivity timer 330 after each detection of a PDCCH communication for the UE 120 for an initial transmission (but not for a retransmission). By operating in this manner, the UE 120 may conserve battery power and reduce power consumption by entering the sleep state 315.

The UE 120 may receive a new DRX configuration upon transitioning to a new cell. Thus, in a high mobility scenario involving frequent cell change, the UE 120 may receive frequent DRX reconfigurations. As a result, the UE 120 may perform adjustment of an encoding timing or a decoding timing relative to an active time indicated by a new DRX configuration for the UE 120, as described herein.

Figure 4:
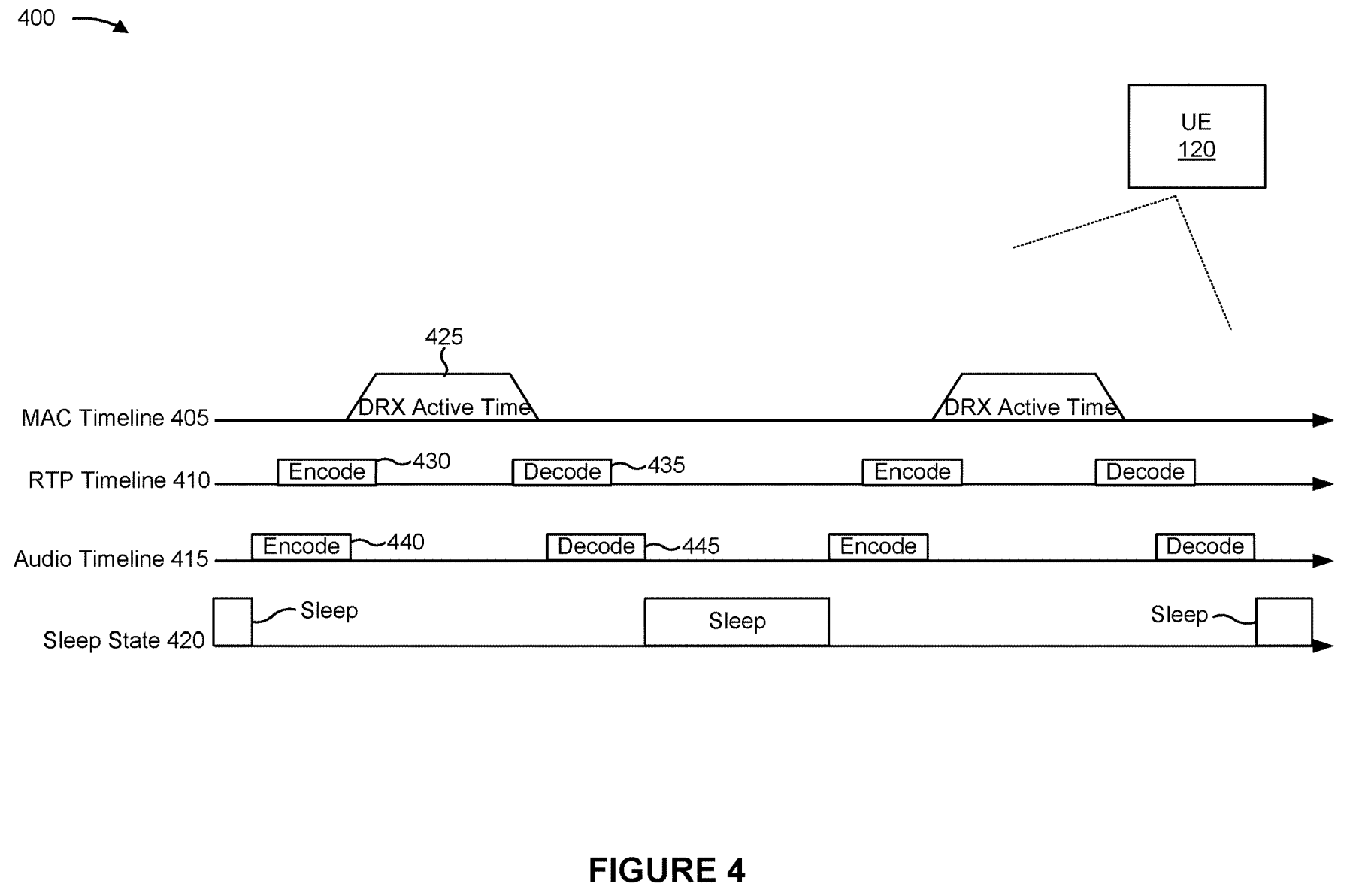

FIG. 4 is a diagram illustrating an example 400 of encoding timing and decoding timing. As shown in FIG. 4, an encoding timing and a decoding timing used by a UE 120 (such as the UE 120 depicted in, and described in connection with, FIG. 3) may be based on a DRX configuration of the UE 120. The UE 120 may be an example of the UE 120 depicted and described in FIGS. 1 and 2. The encoding timing also may be referred to as an encoding timeline, an uplink timeline, a transmission timeline, or a transmission path timeline, and the decoding timing also may be referred to as a decoding timeline, a downlink timeline, a reception timeline, or a reception path timeline. The encoding timing refers to the time position (for example, relative to an active time of the UE 120) of a time period during which the UE 120 performs encoding for uplink transmission of the UE 120. The decoding timing refers to the time position (for example, relative to an active time of the UE 120) of a time period during which the UE 120 performs decoding for downlink reception of the UE 120.

Reference number 405 shows a medium access control (MAC) timeline of the UE 120 (for example, used at a MAC layer of the UE 120). Reference number 410 shows an RTP timeline used for RTP processing at the UE 120. Reference number 415 shows an audio timeline used for audio packet processing at the UE 120. The example 400 may be equally applicable to a type of traffic other than audio, such as video traffic. Reference number 420 shows a sleep state timeline of the UE 120.

As shown by the MAC timeline 405, the UE 120 may periodically operate in an active state during an active time 425 indicated by the DRX configuration, as described herein. As shown by the RTP timeline 410, an encoding timing 430 and a decoding timing 435 used by the UE 120 in connection with RTP processing may be based on the active time 425. For example, the encoding timing 430 may be based on a start of the active time 425 (such as imme- diately before or overlapping with the start of the active time 425), and the decoding timing 435 may be based on an end of the active time 425 (such as overlapping with or imme- diately after the end of the active time 425). As shown by the audio timeline 415, an encoding timing 440 and a decoding timing 445 used by the UE 120 for audio packets may be based on the encoding timing 430 and the decoding timing 435, respectively, used for RTP processing. Thus, the encod- ing timing 440 and the decoding timing 445 also may be based on the active time 425 indicated by the DRX con- figuration. As shown by the sleep state timeline 420, the UE 120 may operate in a sleep state, in connection with the DRX configuration, in time periods outside of the active time 425, the encoding timings 430 and 440, and the decoding timings 435 and 445.

FIG. 5 is a diagram illustrating an example 500 associated with adjustment of an encoding timing or a decoding timing. As shown in FIG. 5, a network entity 501 and a UE 120 (such as the UE 120 depicted in, and described in connection with, FIGS. 3 and 4) may communicate with one another. The UE 120 may be an example of the UE 120 depicted and described in FIGS. 1 and 2. The network entity 501 may be an example of the base station 110, or another network entity, depicted and described in FIGS. 1 and 2. For example, the network entity 501 may include a base station 110 or may include one or more components of a base station 110, such as in a disaggregated radio access network (RAN) configuration or open RAN (O-RAN) configuration. For example, the network entity 501 may include a central unit (CU) of a base station 110 (for example, a node that performs one or more functions of the base station 110 and that controls operation of one or more distributed units (DUs)), a DU of a base station 110 (for example, a node that performs one or more functions of the base station 110 and that is controlled by a CU), a radio unit of a base station 110, a repeater unit, a relay unit, a TRP, or an integrated access and backhaul (IAB) node, among other examples.

As shown by reference number 505, the network entity 501 may transmit, and the UE 120 may receive, one or more of a DRX configuration or a scheduling request configura- tion. In some aspects, the DRX configuration is a DRX reconfiguration for the UE 120. In some aspects, the DRX configuration is a C-DRX configuration, as described herein. In some aspects, the network entity 501 may transmit the DRX configuration in connection with the UE 120 accessing a cell served by the network entity 501. For example, the network entity 501 may transmit the DRX configuration in connection with a handover of the UE 120 to the cell. In some aspects, the scheduling request configuration indicates one or more resources in which the UE 120 may transmit a scheduling request to the network entity 501.

The DRX configuration may indicate an active time, an inactive time, or a DRX cycle, among other examples, for the UE 120. For example, the DRX configuration may indicate a start time for the active time, an end time for the active time (for example, based on a timer duration), a start time for the inactive time, or an end time for the inactive time (for example, based on a timer duration), among other examples. In some aspects, the DRX configuration may indicate the active time in conjunction with one or more of the scheduling request configuration, a semi-persistent scheduling configuration for the UE 120, a configured grant configuration for the UE 120, or one or more configured uplink grants (that is, a dynamic uplink grant provided by the base station 110 without reception of a scheduling request by the base station 110) for the UE 120. In other words, the active time of the UE 120 may be dependent upon the DRX configuration and one or more of the scheduling request configuration, the semi-persistent scheduling (SPS) configuration, the configured grant configuration, or the one or more configured uplink grants.

In some aspects, the DRX configuration may be different relative to a previous DRX configuration of the UE 120 (for example, that was received from the network entity 501 or another network entity). For example, the active time of the DRX configuration may be different from a previous active time indicated by the previous DRX configuration or the DRX cycle length of the DRX configuration may be differ- ent from a previous DRX cycle length indicated by the previous DRX configuration.

As shown by reference number 510, the UE 120 (for example, an IMS of the UE 120) may determine whether at least one of encoding timing adjustment or decoding timing adjustment is triggered by the DRX configuration. In other words, the UE 120 may calculate, ascertain, or determine whether the DRX configuration (for example, reconfigura- tion) is such that there is a need to adjust encoding timing (that is, the transmission path timeline), decoding timing (that is, the reception path timeline), or both encoding timing and decoding timing (which may be referred to as combined adjustment or a combined re-sync operation). In some aspects, the encoding timing may be associated with one or more of a timing for encoding of audio or video packets or a timing for RTP encoding. In some aspects, the decoding timing may be associated with one or more of a timing for decoding of audio or video packets or a timing for RTP decoding.

In some aspects, encoding or decoding timing adjustment is not triggered (that is, can be avoided) if a DRX cycle length indicated by the DRX configuration is greater than a threshold (for example, 40 milliseconds (ms)). This is because a relatively long DRX cycle is usually temporary, and a new DRX configuration is likely to be configured for the UE 120 when the DRX cycle is configured to be relatively long.

In some aspects, encoding or decoding timing adjustment is not triggered if a change of the active time (for example, a change of the DRX timeline), indicated by the DRX configuration, relative to a previous active time indicated by a previous DRX configuration for the UE 120, is less than a threshold. For example, encoding timing adjustment is not triggered if a change of a start time of the active time, relative to a previous start time, is less than the threshold. As another example, decoding timing adjustment is not triggered if a change of an end time of the active time, relative to a previous end time, is less than the threshold. In other words, the DRX configuration may indicate a relatively small change to wake up time instances or sleep time instances, and therefore adjusting encoding timing or decoding timing (that is, performing a re-sync operation) may result in minimal power savings and can be avoided. In some aspects, the UE 120 may determine the change of the active time (for example, the change of the DRX timeline) based on a start time of the active time (for example, a start of an on duration timer), an end time of the active time (for example, an end of the on duration timer), or a time position of one or more resources for scheduling requests (for example, as indicated by the scheduling request configuration).

The UE 120 may determine that timing adjustment for at least one of encoding timing or decoding timing is triggered based on the DRX configuration satisfying one or more conditions for adjusting at least one of the encoding timing or the decoding timing. For example, encoding timing adjustment is triggered based on the DRX configuration satisfying one or more conditions for adjusting the encoding timing. As another example, decoding timing adjustment is triggered based on the DRX configuration satisfying one or more conditions for adjusting the decoding timing. In some aspects, timing adjustment is triggered if a DRX cycle length indicated by the DRX configuration is less than a threshold (for example, 40 ms). Additionally, or alternatively, timing adjustment is triggered if a change of the active time (for example, a change of the DRX timeline), indicated by the DRX configuration, relative to a previous active time indicated by a previous DRX configuration for the UE 120, is greater than a threshold. For example, encoding timing adjustment is triggered if a change of a start time of the active time, relative to a previous start time, is greater than the threshold. As another example, decoding timing adjustment is triggered if a change of an end time of the active time, relative to a previous end time, is greater than the threshold.

As shown by reference number 515, the UE 120 may initiate one or more timers based on determining that timing adjustment is triggered. That is, the UE 120 may initiate the one or more timers based on the DRX configuration satisfying one or more conditions (as described herein) for adjusting at least one of the encoding timing or the decoding timing. The one or more timers may include a timer for adjustment of the encoding timing (which may be referred to herein as an uplink timer), a timer for adjustment of the decoding timing (which may be referred to herein as a downlink timer), or a timer for adjustment of the encoding timing and the decoding timing (which may be referred to herein as an uplink/downlink timer).

In some aspects, the UE 120 may initiate the uplink timer based on a determination that encoding timing adjustment is triggered, as described herein. Additionally, or alternatively, the UE 120 may initiate the downlink timer based on a determination that decoding timing adjustment is triggered, as described herein. Additionally, or alternatively, the UE 120 may initiate the uplink/downlink timer based on a determination that encoding timing adjustment and downlink timing adjustment is triggered, as described herein. A timer may provide a failsafe mechanism for encoding or decoding timing adjustment in the event that an absence of traffic (for example, a silence period) does not occur until a relatively long time following triggering of the timing adjustment.

As shown by reference number 520, the UE 120 may selectively adjust at least one of an encoding timing (for example, a timing of audio or video packet encoding or a timing of RTP encoding) or a decoding timing (for example, a timing of audio or video packet decoding or a timing of RTP decoding) used by the UE 120. For example, the UE 120 may adjust the encoding timing or the decoding timing (that is, perform a transmission or reception re-sync operation) if timing adjustment for the encoding timing or the decoding timing, respectively, is triggered. The UE 120 may adjust the encoding timing or the decoding timing based on the DRX configuration. For example, the UE 120 may adjust the encoding timing or the decoding timing relative to the DRX active time indicated by the DRX configuration. As an example, the UE 120 may adjust the encoding timing to have a particular relationship (for example, in time) relative to a start time of the active time or adjust the decoding timing to have a particular relationship (for example, in time) relative to an end time of the active time.

In some aspects, the UE 120 may refrain from adjusting the encoding timing and the decoding timing if timing adjustment is not triggered, as described herein. For example, the UE 120 may refrain from adjusting the encoding timing and the decoding timing if a DRX cycle length indicated by the DRX configuration is greater than a threshold. As another example, the UE 120 may refrain from adjusting the encoding timing and the decoding timing if a change of the DRX active time (for example, the DRX timeline), relative to a previous DRX active time of a previous DRX configuration for the UE 120, is less than a threshold.

In some aspects, the UE 120 may adjust at least one of the encoding timing or the decoding timing if a DRX cycle length indicated by the DRX configuration is less than a threshold. Additionally, or alternatively, the UE 120 may adjust at least one of the encoding timing or the decoding timing if a change to the DRX active time (for example, the DRX timeline), relative to a previous DRX active time of a previous DRX configuration for the UE, is greater than a threshold. In some aspects, the UE 120 may adjust at least one of the encoding timing or the decoding timing at a particular time (for example, other than when the DRX configuration is received) that is according to when the DRX configuration is received by the UE 120 (that is, according to when timing adjustment is triggered based on reception of the DRX configuration). For example, the UE 120 may adjust at least one of the encoding timing or the decoding timing at a particular time that is according to a traffic condition at the UE 120 when the DRX configuration is received by the UE 120 (that is, according to a traffic condition when timing adjustment is triggered). In other words, the UE 120 may adjust at least one of the encoding timing or the decoding timing based on whether the DRX configuration is received by the UE 120 (that is, whether timing adjustment is triggered) during a time period in which traffic (for example, uplink traffic from the UE 120 or downlink traffic to the UE 120) is absent or present. In some aspects, the UE 120 may perform encoding timing adjustment and decoding timing adjustment independently of each other (for example, at different times). In some aspects, the UE 120 may perform encoding timing adjustment and decoding timing adjustment together (for example, at the same time).

In some aspects, based on the DRX configuration satisfying one or more conditions for adjusting the encoding timing (for example, a condition that a change to a DRX timeline is greater than a threshold), the UE 120 may adjust the encoding timing at a time at which uplink traffic is absent (for example, as detected by the UE 120). Additionally, or alternatively, based on the DRX configuration satisfying one or more conditions for adjusting the decoding timing (for example, a condition that a change to a DRX timeline is greater than a threshold), the UE 120 may adjust the decoding timing at a time at which downlink traffic is absent (for example, as detected by the UE 120). Additionally, or alternatively, based on the DRX configuration satisfying one or more conditions for adjusting the encoding timing and the decoding timing (for example, a condition that a change to a DRX cycle length is greater than a threshold), the UE 120 may adjust the encoding timing and the decoding timing at a time at which uplink traffic and downlink traffic are absent (for example, as detected by the UE 120).

The uplink traffic may be uplink streaming traffic, and the downlink traffic may be downlink streaming traffic. For example, the uplink traffic may be an uplink talkspurt, and the downlink traffic may be a downlink talkspurt. Thus, a time at which a downlink talkspurt is absent may include a downlink silence period, which may be detected by the UE 120 if a de-jitter buffer of the UE 120 is empty or a last dequeue from the buffer was a silence insertion descriptor (SID) frame, or a combination thereof, or if the buffer contains only SID frames. Similarly, a time at which an uplink talkspurt is absent may include an uplink silence period, which may be detected by the UE 120 based on receiving an SID frame, or an empty frame, from a codec of the UE 120 (for example, a vocoder).

In some aspects, if encoding timing adjustment is triggered (for example, the DRX configuration satisfies one or more conditions for adjusting the encoding timing), the UE 120 may adjust the encoding timing prior to expiration of the uplink timer and at a time at which uplink traffic is absent. For example, prior to expiration of the uplink timer, the UE 120 may immediately perform a transmission re-sync operation if the UE 120 detects an uplink silence period. Based on adjusting the encoding timing prior to expiration of the uplink timer, the UE 120 may terminate the uplink timer.

In some aspects, after encoding timing adjustment is triggered (for example, the subsequent DRX configuration satisfies one or more conditions for adjusting the encoding timing), the UE 120 may receive, from the network entity 501 or another network entity, a subsequent DRX configuration for the UE 120 prior to expiration of the uplink timer. Here, the UE 120 may terminate the uplink timer (and refrain from adjusting the encoding timing) and initiate the uplink/downlink timer (and perform encoding and decoding timing adjustment, as described herein) if the subsequent DRX configuration triggers encoding and decoding timing adjustment (for example, the subsequent DRX configuration satisfies one or more conditions for adjusting the encoding timing and the decoding timing). Alternatively, the UE 120 may terminate the uplink timer (and refrain from adjusting the encoding timing) if the subsequent DRX configuration does not trigger encoding timing adjustment (for example, the subsequent DRX configuration does not satisfy one or more conditions for adjusting the encoding timing). Alternatively, the UE 120 may reinitiate the uplink timer (and perform encoding timing adjustment, as described herein) if the subsequent DRX configuration triggers encoding timing adjustment (for example, the subsequent DRX configuration satisfies one or more conditions for adjusting the encoding timing).

In some aspects, if encoding timing adjustment is triggered (for example, the DRX configuration satisfies one or more conditions for adjusting the encoding timing), the UE

120 may adjust the encoding timing upon expiration of the uplink timer if uplink traffic is present for a duration of the uplink timer. That is, the UE 120 may adjust the encoding timing upon expiration of the uplink timer if there is no period of uplink silence that is detected by the UE 120, and a subsequent DRX configuration is not received by the UE 120, while the uplink timer is running.

In some aspects, if decoding timing adjustment is triggered (for example, the DRX configuration satisfies one or more conditions for adjusting the decoding timing), the UE 120 may adjust the decoding timing prior to expiration of the downlink timer and at a time at which downlink traffic is absent. For example, prior to expiration of the downlink timer, the UE 120 may immediately perform a reception re-sync operation if the UE 120 detects a downlink silence period. Based on adjusting the decoding timing prior to expiration of the downlink timer, the UE 120 may terminate the downlink timer.

In some aspects, after decoding timing adjustment is triggered (for example, the DRX configuration satisfies one or more conditions for adjusting the decoding timing), the UE 120 may receive, from the network entity 501 or another network entity, a subsequent DRX configuration for the UE 120 prior to expiration of the downlink timer. Here, the UE 120 may terminate the downlink timer (and refrain from adjusting the decoding timing) and initiate the uplink/downlink timer (and perform encoding and decoding timing adjustment, as described herein) if the subsequent DRX configuration triggers encoding and decoding timing adjustment (for example, the subsequent DRX configuration satisfies one or more conditions for adjusting the encoding timing and the decoding timing). Alternatively, the UE 120 may terminate the downlink timer (and refrain from adjusting the decoding timing) if the subsequent DRX configuration does not trigger decoding timing adjustment (for example, the subsequent DRX configuration does not satisfy one or more conditions for adjusting the decoding timing). Alternatively, the UE 120 may reinitiate the downlink timer (and perform decoding timing adjustment, as described herein) if the subsequent DRX configuration triggers decoding timing adjustment (for example, the subsequent DRX configuration satisfies one or more conditions for adjusting the decoding timing).

In some aspects, if decoding timing adjustment is triggered (for example, the DRX configuration satisfies one or more conditions for adjusting the decoding timing), the UE 120 may adjust the decoding timing upon expiration of the downlink timer if downlink traffic is present for a duration of the downlink timer. That is, the UE 120 may adjust the decoding timing upon expiration of the downlink timer if there is no period of downlink silence that is detected by the UE 120, and a subsequent DRX configuration is not received by the UE 120, while the downlink timer is running.

In some aspects, if encoding and decoding timing adjustment is triggered (for example, the DRX configuration satisfies one or more conditions for adjusting the encoding timing and the decoding timing, such as by reconfiguring the DRX cycle length relative to a previous DRX configuration), the UE 120 may adjust the encoding timing and the decoding timing prior to expiration of the uplink/downlink timer and at a time at which uplink traffic and downlink traffic are absent. For example, prior to expiration of the uplink/downlink timer, the UE 120 may immediately perform a combined re-sync operation if the UE 120 detects a mutual silence period (that is, a concurrent uplink silence period and downlink silence period). Based on adjusting the encoding timing and the decoding timing prior to expiration of the uplink/downlink timer, the UE 120 may terminate the uplink/downlink timer.

In some aspects, after encoding and decoding timing adjustment is triggered (for example, the DRX configuration satisfies one or more conditions for adjusting the encoding timing and the decoding timing), the UE 120 may receive, from the network entity 501 or another network entity, a subsequent DRX configuration for the UE 120 prior to expiration of the uplink/downlink timer. Here, the UE 120 may terminate the uplink/downlink timer (and refrain from adjusting the encoding timing and the decoding timing) and initiate the uplink timer (and perform encoding timing adjustment), or initiate the downlink timer (and perform decoding timing adjustment), if the subsequent DRX configuration triggers only one of encoding timing adjustment or decoding timing adjustment (for example, the subsequent DRX configuration satisfies one or more conditions for adjusting only one of the encoding timing or the decoding timing). Alternatively, the UE 120 may terminate the uplink/downlink timer (and refrain from adjusting the encoding timing and the decoding timing) if the subsequent DRX configuration does not trigger either of encoding timing adjustment or decoding timing adjustment (for example, the subsequent DRX configuration does not satisfy one or more conditions for adjusting either of the encoding timing or the decoding timing). Alternatively, the UE 120 may reinitiate the uplink/downlink timer (and perform encoding and decoding timing adjustment, as described herein) if the subsequent DRX configuration triggers encoding and decoding timing adjustment (for example, the subsequent DRX configuration satisfies one or more conditions for adjusting the encoding timing and the decoding timing).

In some aspects, if encoding and decoding timing adjustment is triggered (for example, the DRX configuration satisfies one or more conditions for adjusting the encoding timing and the decoding timing), the UE 120 may adjust the encoding and decoding timing upon expiration of the uplink/downlink timer if at least one of uplink traffic or downlink traffic is present for a duration of the downlink timer. That is, the UE 120 may adjust the encoding timing and the decoding timing upon expiration of the uplink/downlink timer if there is no period of mutual silence that is detected by the UE 120, and a subsequent DRX configuration is not received by the UE 120, while the uplink/downlink timer is running.

As shown by reference number 525, the UE 120 and the network entity 501 may communicate in accordance with the DRX configuration. In particular, the UE 120 may receive downlink transmissions from the network entity 501, or the UE 120 may perform uplink transmissions to the network entity 501, during the DRX active time indicated by the DRX configuration. In some aspects, the UE 120 may communicate with the network entity 501 in accordance with an adjustment to the encoding timing, the decoding timing, or both the encoding timing and the decoding timing. For example, the UE 120 may perform encoding, in connection with uplink transmissions, in accordance with an adjustment to the encoding timing. Similarly, the UE 120 may perform decoding, in connection with downlink reception, in accordance with an adjustment to the decoding timing.

In some aspects, the UE 120 may receive an indication that the DRX configuration is to be released. The UE 120 may receive the indication from the network entity 501 or from another network entity. For example, the UE 120 may receive the indication in connection with a handover of the UE 120 from a current cell to a new cell. In some aspects, timing adjustment is not triggered if the DRX configuration is released. That is, the UE 120 may refrain from adjusting the encoding timing and the decoding timing if the DRX configuration is released. This is because the DRX configuration of the UE 120 may be temporarily released when cell association changes during handover, and after handover completion, a new DRX configuration is likely to be configured for the UE 120. Accordingly, adjusting encoding timing or decoding timing (that is, performing a re-sync operation) after release of the DRX configuration may deteriorate communication quality (for example, audio quality) and can be avoided.

In some aspects, the techniques described herein may be performed in connection with a target wake time (TWT) configuration for the UE 120 that indicates the active time. The TWT configuration may be used for WiFi communication or other wireless local area network (WLAN) communication of the UE 120. In some aspects, the DRX configuration described herein may refer to a TWT configuration.

FIGS. 6A-6E are diagrams illustrating examples 600, 610, 620, 630, and 640 associated with adjustment of a decoding timing. While the examples 600, 610, 620, 630, and 640 are described in terms of downlink talkspurts, the examples 600, 610, 620, 630, and 640 are equally applicable to other types of downlink traffic. A UE 120, as described in connection with FIGS. 6A-6E, may be an example of the UE 120 depicted and described in FIGS. 1 and 2.

Figure 6A:
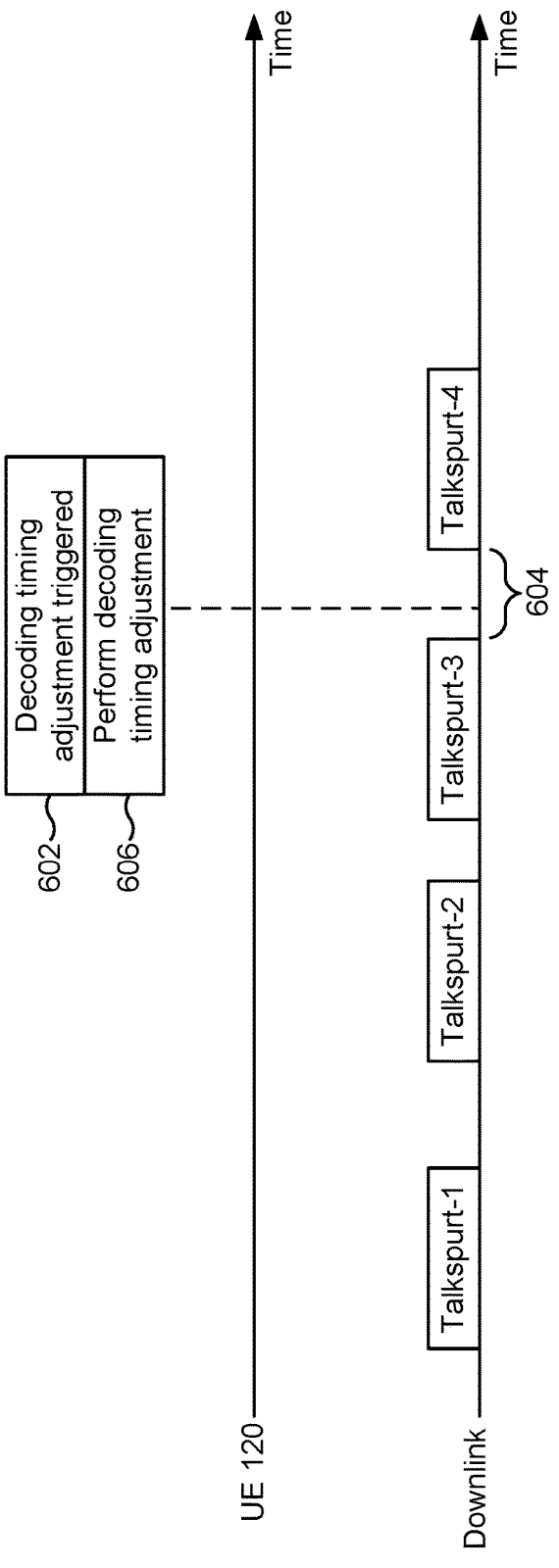
FIGS. 6A-6E are diagrams illustrating examples associated with adjustment of a decoding timing.

As shown in FIG. 6A, a decoding timing adjustment may be triggered at a UE 120 (for example, by reception of a DRX configuration), as described herein and shown by reference number 602, during a downlink silence period shown by reference number 604. Accordingly, the UE 120 may immediately perform decoding timing adjustment (that is, a reception re-sync operation), shown by reference number 606, during the downlink silence period 604.

Figure 6B:
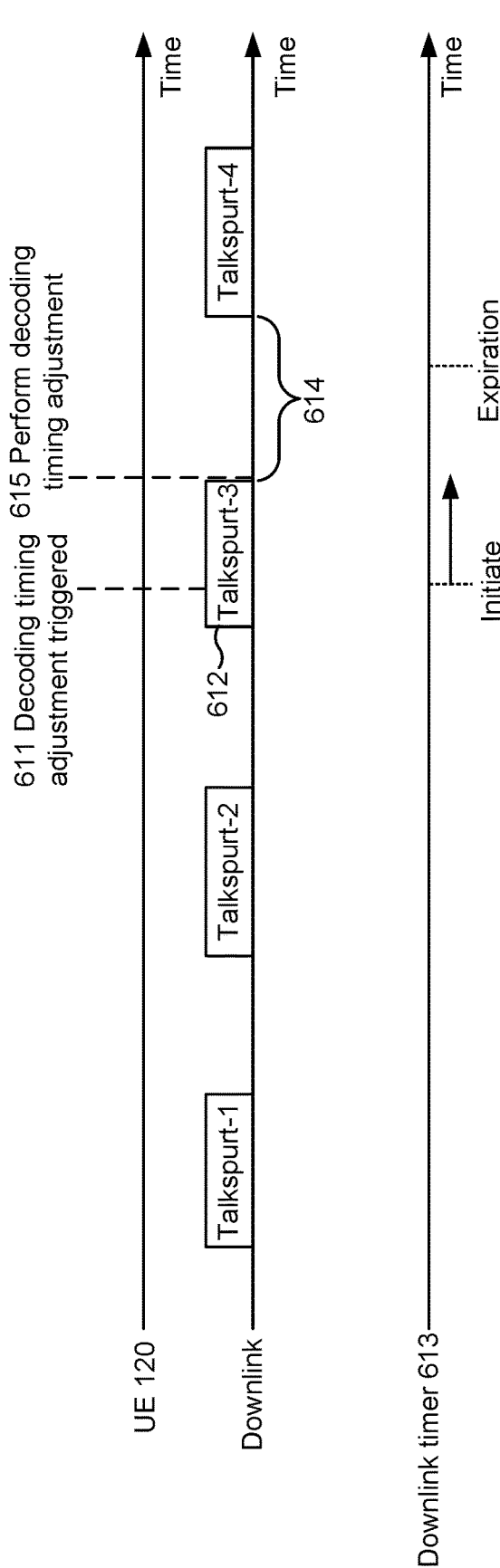

As shown in FIG. 6B, a decoding timing adjustment may be triggered at a UE 120 (for example, by reception of a DRX configuration), as described herein and shown by reference number 611, during a downlink talkspurt shown by reference number 612. Accordingly, the UE 120 may initiate the downlink timer 613, as described herein. If the UE 120 detects a downlink silence period, shown by reference number 614, prior to expiration of the downlink timer 613, the UE 120 may perform decoding timing adjustment, shown by reference number 615 at a time that the downlink silence period is detected.

Figure 6C:
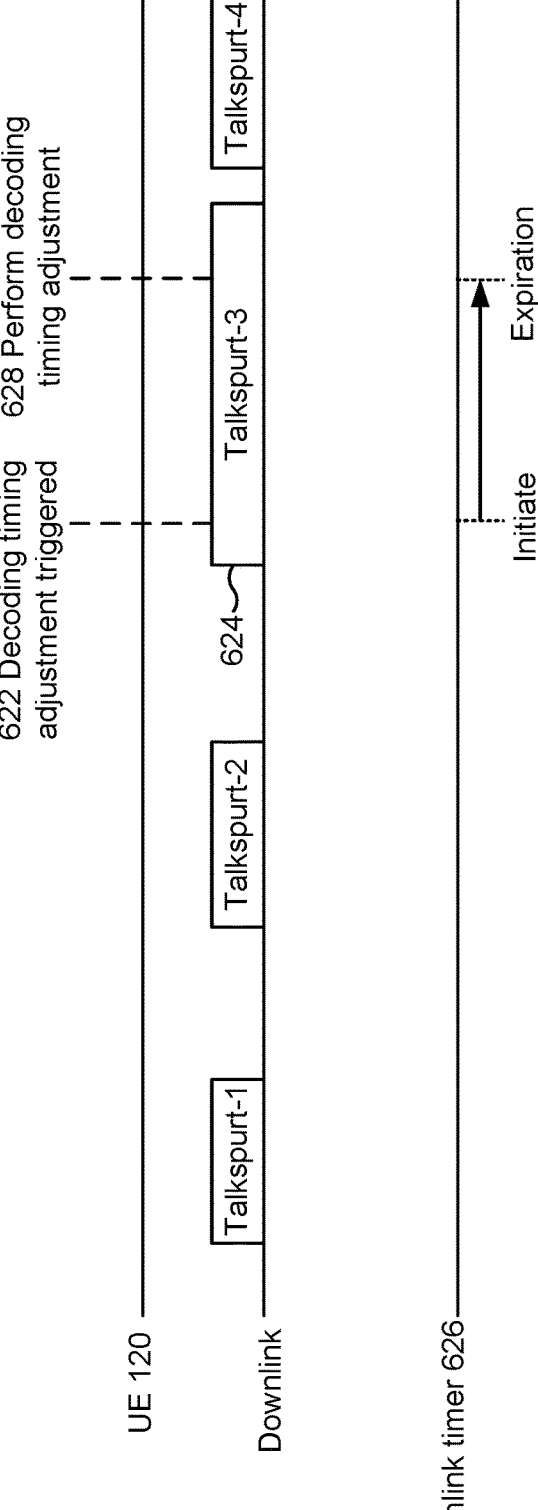

As shown in FIG. 6C, a decoding timing adjustment may be triggered at a UE 120 (for example, by reception of a DRX configuration), as described herein and shown by reference number 622, during a downlink talkspurt shown by reference number 624. Accordingly, the UE 120 may initiate the downlink timer 626, as described herein. If the downlink timer 626 expires prior to the UE 120 detecting a downlink silence period, the UE 120 may perform decoding timing adjustment, shown by reference number 628, upon expiration of the downlink timer 626.

Figure 6D:
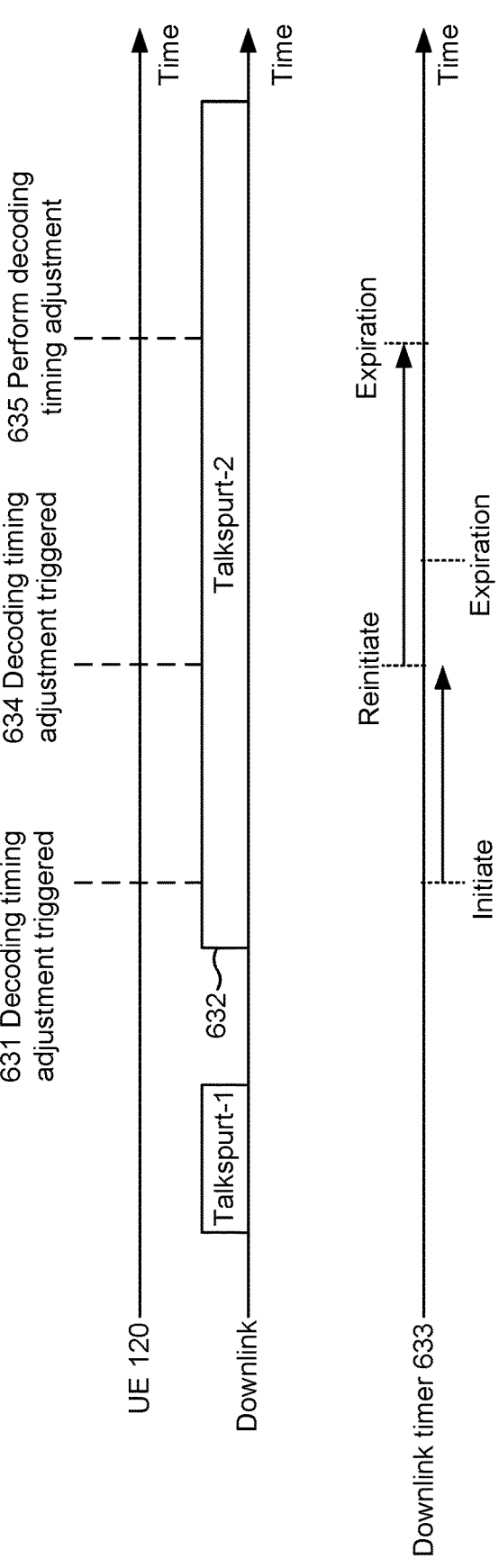

As shown in FIG. 6D, a decoding timing adjustment may be triggered at a UE 120 (for example, by reception of a DRX configuration), as described herein and shown by reference number 631, during a downlink talkspurt shown by reference number 632. Accordingly, the UE 120 may initiate the downlink timer 633, as described herein. Prior to expiration of the downlink timer 633, the UE 120 may receive another DRX configuration that triggers decoding timing adjustment at the UE 120, as shown by reference number 634. Based on receiving the other DRX configuration that triggers decoding timing adjustment, the UE 120 may reinitiate the downlink timer 633. If the downlink timer 633 expires prior to the UE 120 detecting a downlink silence period, the UE 120 may perform decoding timing adjustment, shown by reference number 635, upon expiration of the downlink timer 633.

Figure 6E:
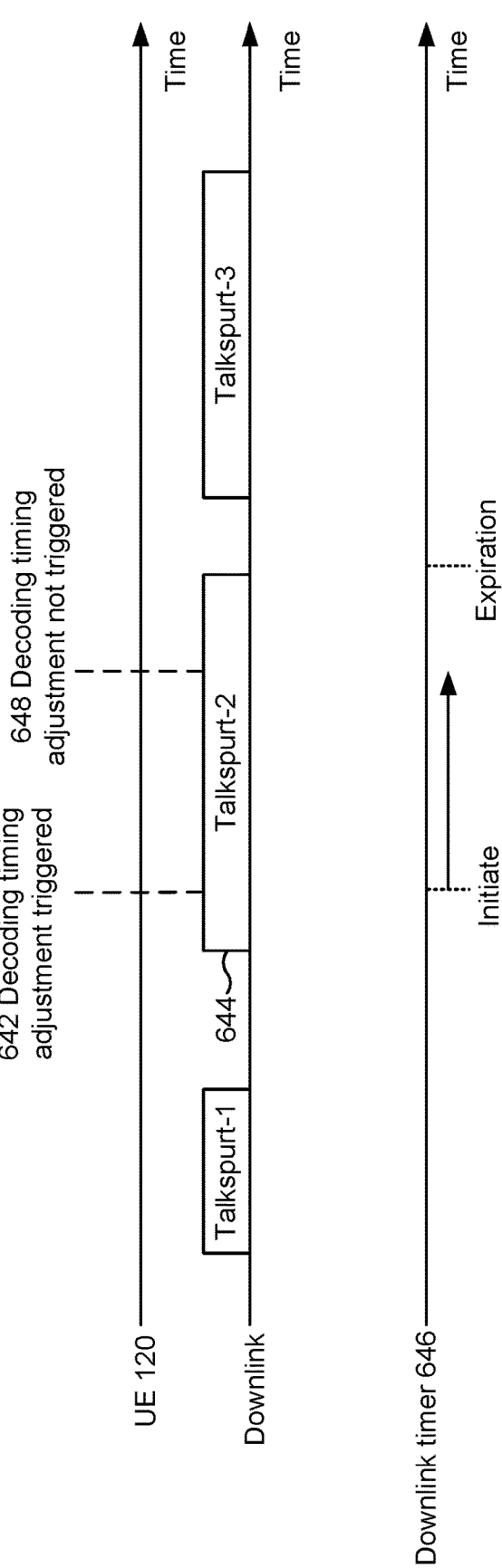

As shown in FIG. 6E, a decoding timing adjustment may be triggered at a UE 120 (for example, by reception of a DRX configuration), as described herein and shown by reference number 642, during a downlink talkspurt shown by reference number 644. Accordingly, the UE 120 may initiate the downlink timer 646, as described herein. Prior to expiration of the downlink timer 646, the UE 120 may receive another DRX configuration that does not trigger decoding timing adjustment at the UE 120, as shown by reference number 648. Based on receiving the other DRX configuration that does not trigger decoding timing adjustment, the UE 120 may terminate the downlink timer 646 and refrain from performing decoding timing adjustment.

Figure 7A:
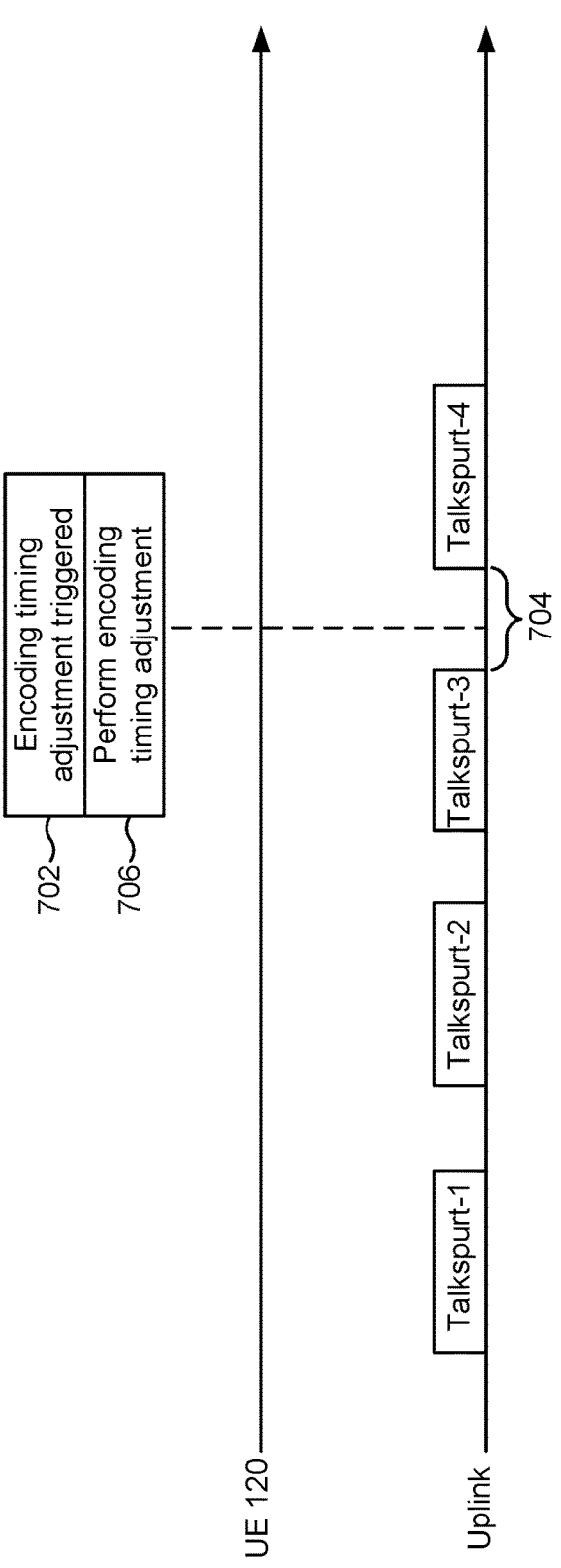
FIGS. 7A-7C are diagrams illustrating examples associated with adjustment of an encoding timing.
Figure 7B:
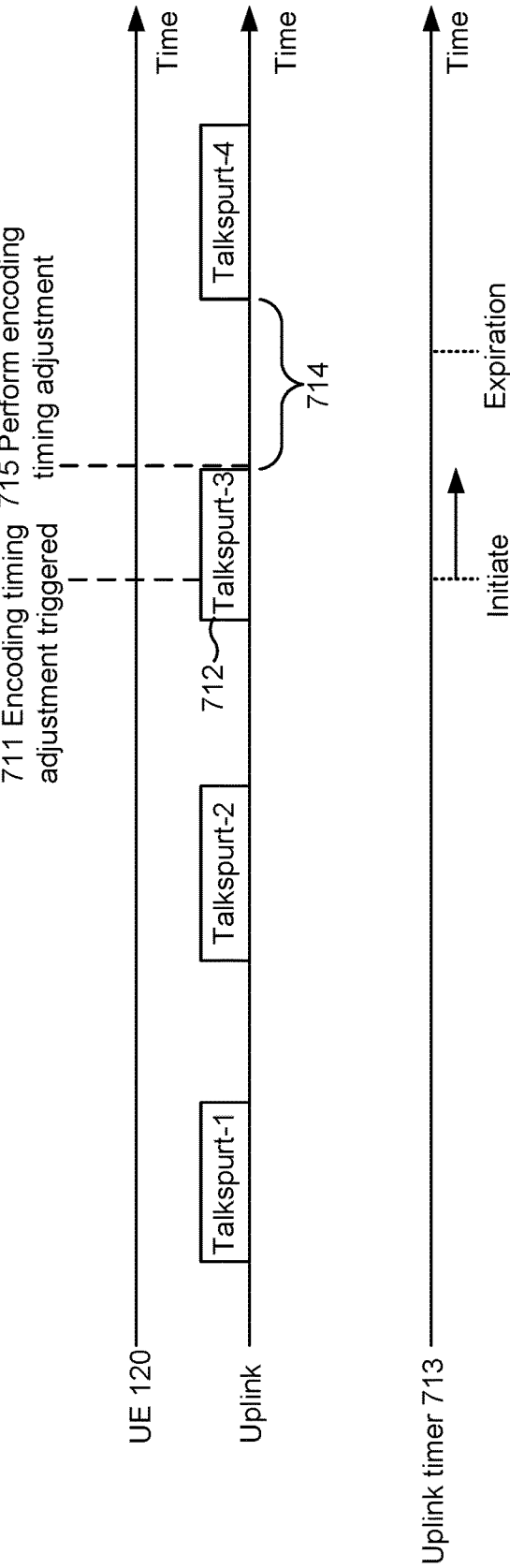
Figure 7C:
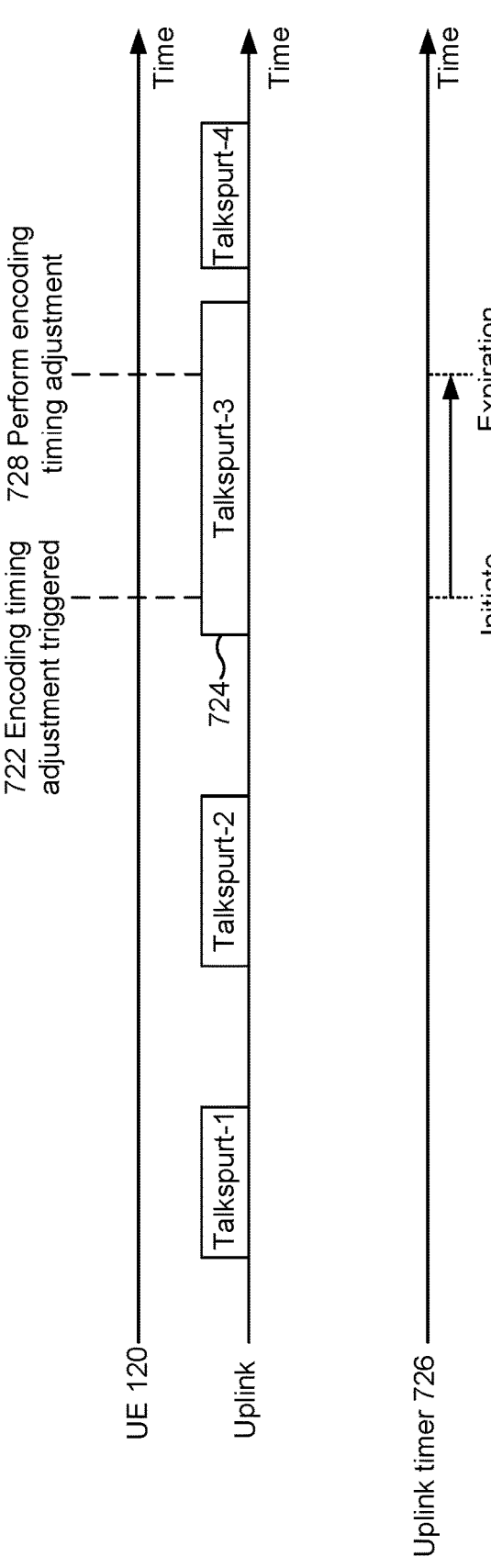

FIGS. 7A-7C are diagrams illustrating examples 700, 710, and 720 associated with adjustment of an encoding timing. While the examples 700, 710, and 720 are described in terms of uplink talkspurts, the examples 700, 710, and 720 are equally applicable to other types of uplink traffic. A UE 120, as described in connection with FIGS. 7A-7C, may be an example of the UE 120 depicted and described in FIGS. 1 and 2.

As shown in FIG. 7A, an encoding timing adjustment may be triggered at a UE 120 (for example, by reception of a DRX configuration), as described herein and shown by reference number 702, during an uplink silence period shown by reference number 704. Accordingly, the UE 120 may immediately perform encoding timing adjustment (that is, a transmission re-sync operation), shown by reference number 706, during the uplink silence period 704.

As shown in FIG. 7B, an encoding timing adjustment may be triggered at a UE 120 (for example, by reception of a DRX configuration), as described herein and shown by reference number 711, during an uplink talkspurt shown by reference number 712. Accordingly, the UE 120 may initiate the uplink timer 713, as described herein. If the UE 120 detects an uplink silence period, shown by reference number 714, prior to expiration of the uplink timer 713, the UE 120 may perform encoding timing adjustment, shown by reference number 715, at a time that the uplink silence period is detected.

As shown in FIG. 7C, an encoding timing adjustment may be triggered at a UE 120 (for example, by reception of a DRX configuration), as described herein and shown by reference number 722, during an uplink talkspurt shown by reference number 724. Accordingly, the UE 120 may initiate the uplink timer 726, as described herein. If the uplink timer 726 expires prior to the UE 120 detecting an uplink silence period, the UE 120 may perform encoding timing adjustment, as shown by reference number 728, upon expiration of the uplink timer 726.

FIGS. 8A-8D are diagrams illustrating examples 800, 810, 820, and 830 associated with adjustment of an encoding timing and a decoding timing. While the examples 800, 810, 820, and 830 are described in terms of uplink and downlink talkspurts, the examples 800, 810, 820, and 830 are equally applicable to other types of uplink and downlink traffic. A UE 120, as described in connection with FIGS. 8A-8D, may be an example of the UE 120 depicted and described in FIGS. 1 and 2.

Figure 8A:
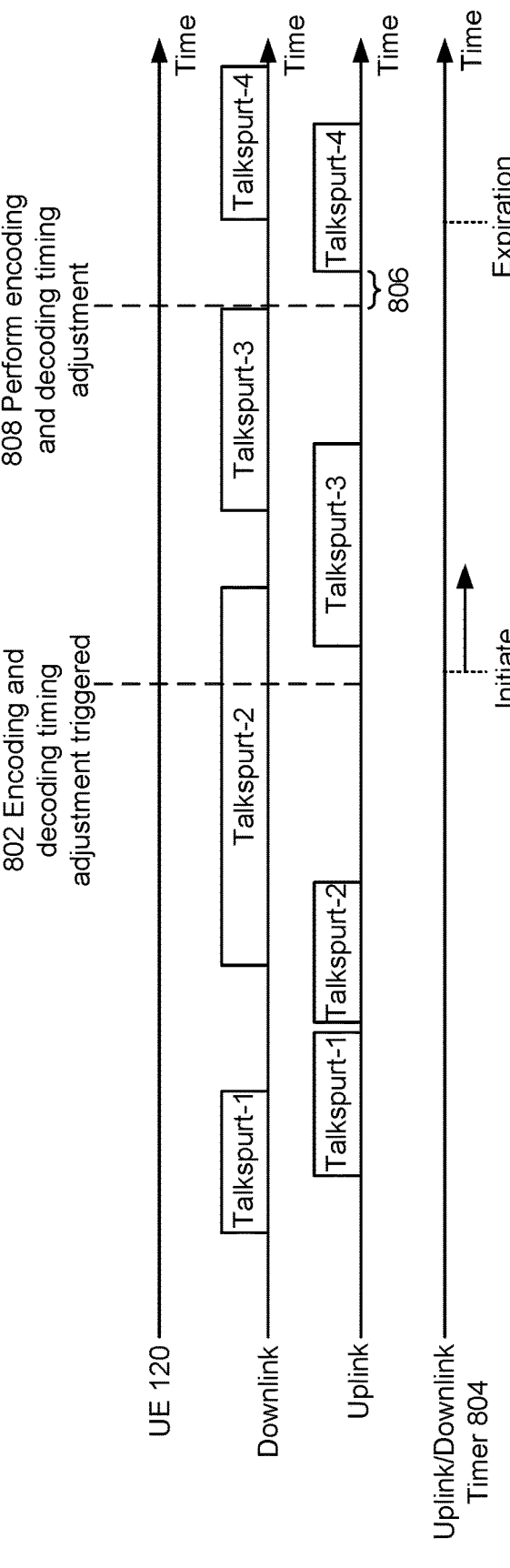
FIGS. 8A-8D are diagrams illustrating examples associated with adjustment of an encoding timing and a decoding timing.

As shown in FIG. 8A, encoding and decoding timing adjustment may be triggered at a UE 120 (for example, by reception of a DRX configuration), as described herein and shown by reference number 802. For example, the DRX configuration may change a DRX cycle time relative to a previous DRX configuration (such as, from 40 ms to 20 ms). Based on encoding and decoding timing adjustment being triggered, the UE 120 may initiate the uplink/downlink timer 804, as described herein. If the UE 120 detects a mutual silence period (that is, a concurrent uplink silence period and downlink silence period), shown by reference number 806, prior to expiration of the uplink/downlink timer 804, the UE 120 may perform encoding and decoding timing adjustment (that is, a combined re-sync operation), shown by reference number 808, at a time that the mutual silence period is detected.

Figure 8B:
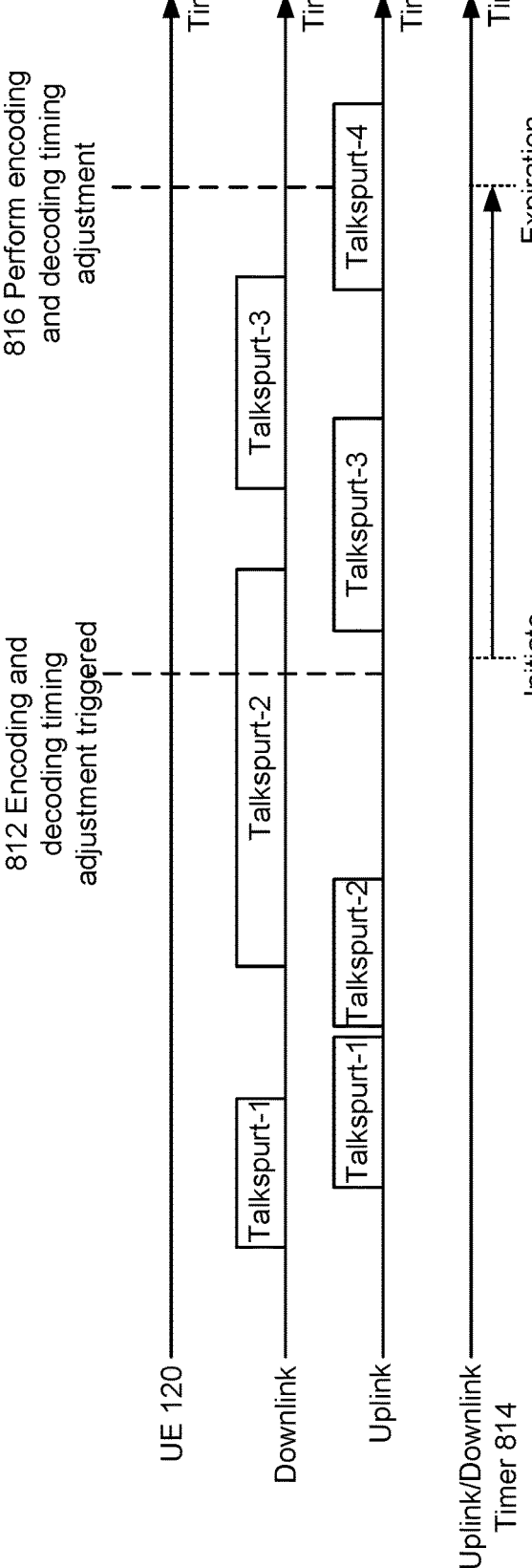

As shown in FIG. 8B, encoding and decoding timing adjustment may be triggered at a UE 120 (for example, by reception of a DRX configuration), as described herein and shown by reference number 812. Accordingly, the UE 120 may initiate the uplink/downlink timer 814, as described herein. If the uplink/downlink timer 814 expires prior to the UE 120 detecting a mutual silence period, the UE 120 may perform encoding and decoding timing adjustment, shown by reference number 816, upon expiration of the uplink/downlink timer 814.

Figure 8C:
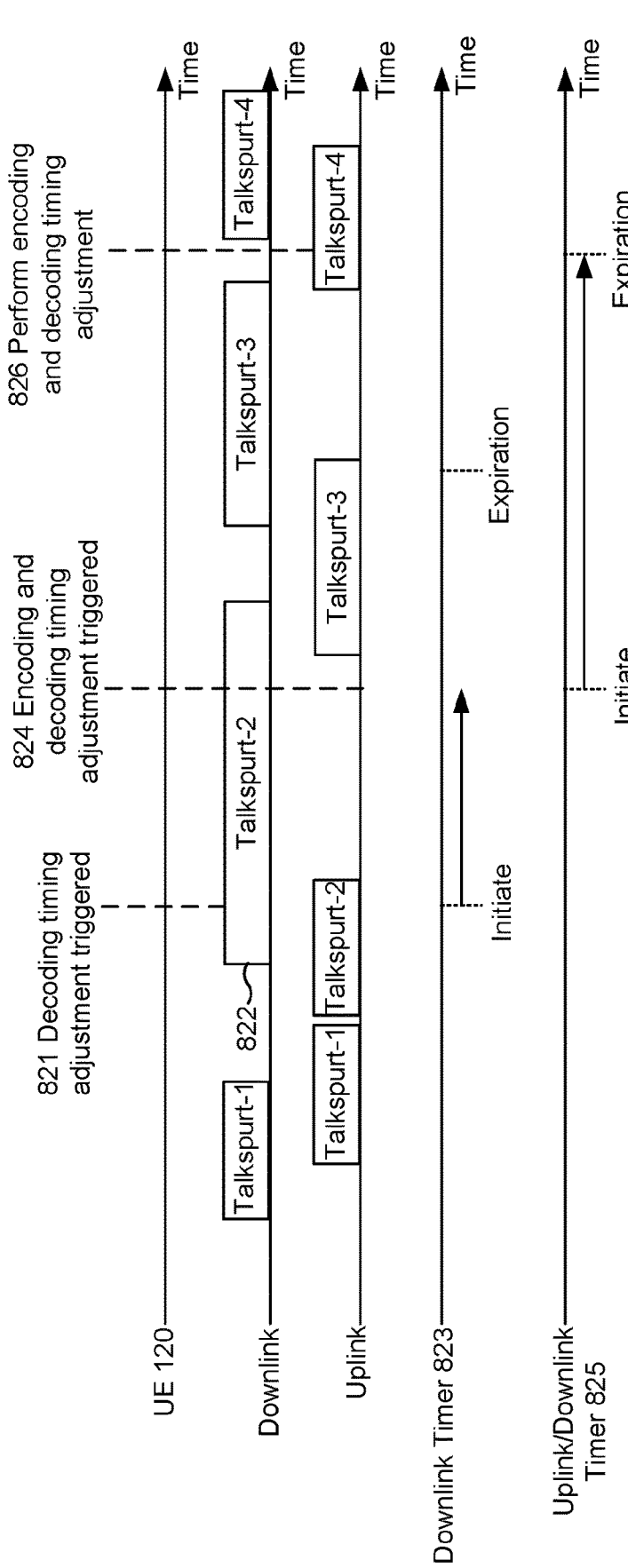

As shown in FIG. 8C, decoding timing adjustment may be triggered at a UE 120 (for example, by reception of a DRX configuration), as described herein and shown by reference number 821, during a downlink talkspurt shown by reference number 822. Accordingly, the UE 120 may initiate the downlink timer 823, as described herein. Prior to expiration of the downlink timer 823, the UE 120 may receive another DRX configuration that triggers encoding and decoding timing adjustment at the UE 120, as shown by reference number 824. Based on receiving the other DRX configuration that triggers encoding and decoding timing adjustment, the UE 120 may terminate the downlink timer 823 and initiate the uplink/downlink timer 825. If the uplink/downlink timer 825 expires prior to the UE 120 detecting a mutual silence period, the UE 120 may perform encoding and decoding timing adjustment, shown by reference number 826, upon expiration of the uplink/downlink timer 825. In some other cases, if the UE 120 detects a mutual silence period, prior to expiration of the uplink/downlink timer 825, the UE 120 may perform encoding and decoding timing adjustment at a time that the mutual silence period is detected.

Figure 8D:
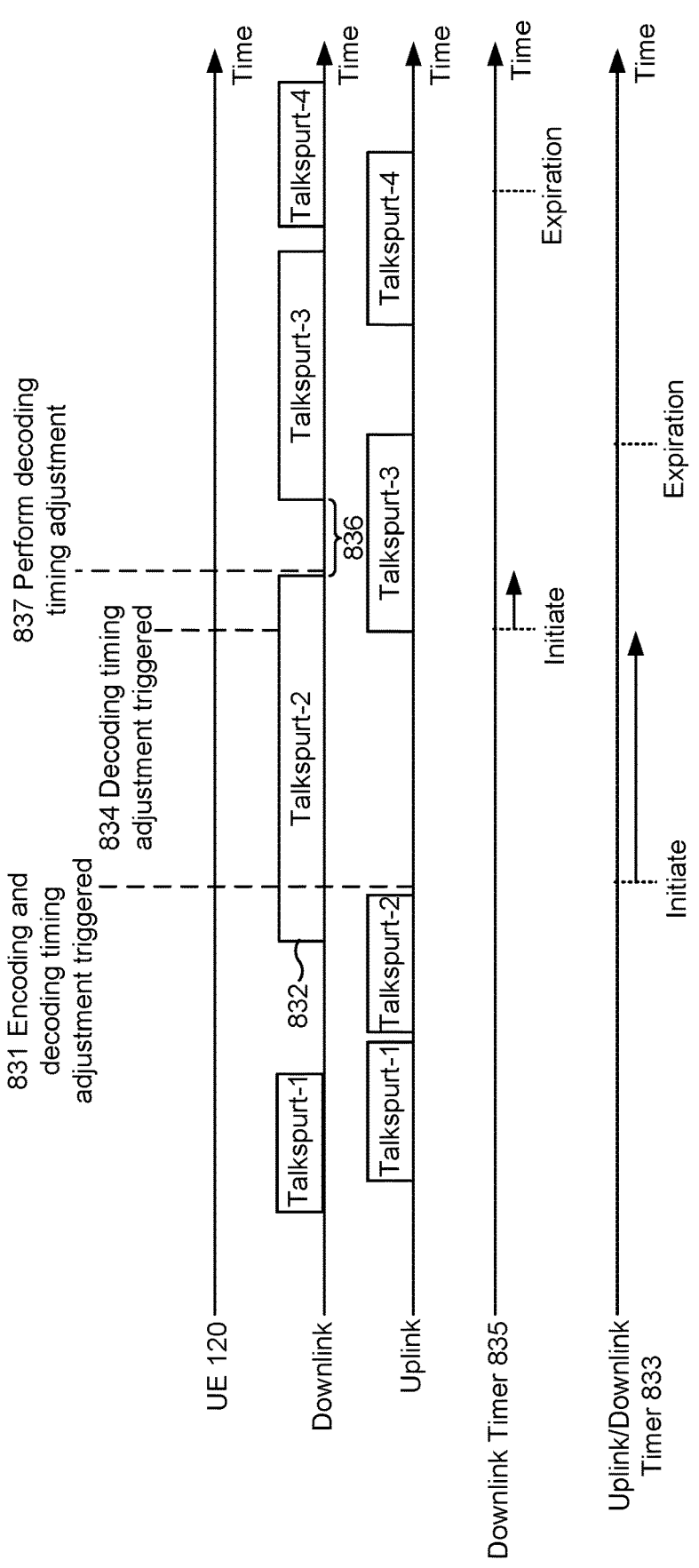

As shown in FIG. 8D, encoding and decoding timing adjustment may be triggered at a UE 120 (for example, by reception of a DRX configuration), as described herein and shown by reference number 831, during a downlink talk-spurt shown by reference number 832 (additionally, or alternatively, encoding and decoding timing adjustment may be triggered during an uplink talkspurt). Accordingly, the UE 120 may initiate the uplink/downlink timer 833, as described herein. Prior to expiration of the uplink/downlink timer 833, the UE 120 may receive another DRX configuration that triggers decoding timing adjustment (but not encoding timing adjustment) at the UE 120, as shown by reference number 834. Based on receiving the other DRX configuration that triggers decoding timing adjustment, the UE 120 may terminate the uplink/downlink timer 833 and initiate the downlink timer 835. If the UE 120 detects a downlink silence period, shown by reference number 836, prior to expiration of the downlink timer 835, the UE 120 may perform decoding timing adjustment, shown by reference number 837, at a time that the downlink silence period is detected. In some other cases, if the downlink timer 835 expires prior to the UE 120 detecting a downlink silence period, the UE 120 may perform decoding timing adjustment upon expiration of the downlink timer 835.

Figure 9:
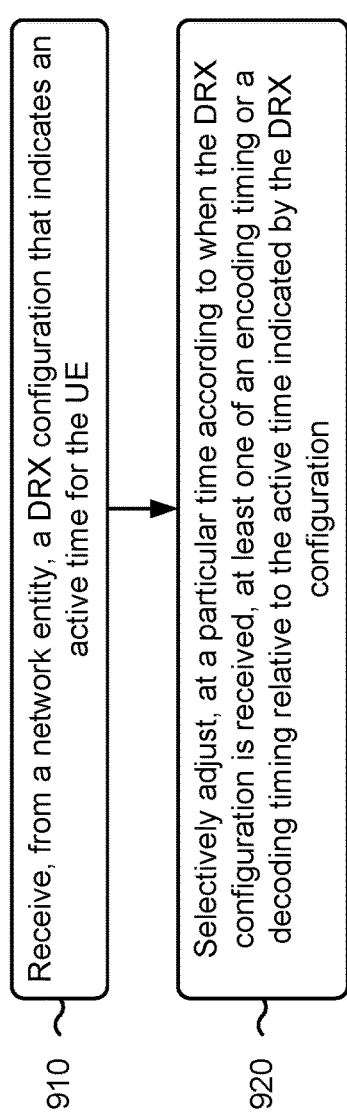
FIG. 9 is a diagram illustrating an example process performed, for example, by a UE.

FIG. 9 is a diagram illustrating an example process 900 performed, for example, by a UE. The process 900 is an example where the UE (for example, UE 120 depicted and described in FIGS. 1 and 2) performs operations associated with adjustment of an encoding timing or a decoding timing.

As shown in FIG. 9, in some aspects, the process 900 may include receiving, from a network entity, a DRX configuration that indicates an active time for the UE (block 910). For example, the UE (such as by using communication manager 140 or reception component 1002, depicted in FIG. 10) may receive, from a network entity, a DRX configuration that indicates an active time for the UE.

As further shown in FIG. 9, in some aspects, the process 900 may include selectively adjusting, at a particular time according to when the DRX configuration is received, at least one of an encoding timing or a decoding timing relative to the active time indicated by the DRX configuration (block 920). For example, the UE (such as by using communication manager 140 or adjustment component 1010, depicted in FIG. 10) may selectively adjust, at a particular time according to when the DRX configuration is received, at least one of an encoding timing or a decoding timing relative to the active time indicated by the DRX configuration.

The process 900 may include additional aspects, such as any single aspect or any combination of aspects described in connection with the process 900 or in connection with one or more other processes described elsewhere herein.

In a first additional aspect, the encoding timing is associated with one or more of encoding of audio or video packets or RTP encoding, and the decoding timing is associated with one or more of decoding of audio or video packets or RTP decoding.

In a second additional aspect, alone or in combination with the first aspect, selectively adjusting at least one of the encoding timing or the decoding timing includes adjusting at least one of the encoding timing or the decoding timing if a DRX cycle length indicated by the DRX configuration is less than a threshold, and a change to the active time, relative to a previous active time indicated by a previous DRX configuration for the UE, is greater than a threshold.

In a third additional aspect, alone or in combination with one or more of the first and second aspects, selectively adjusting at least one of the encoding timing or the decoding timing includes at least one of adjusting, based on the DRX configuration satisfying one or more conditions for adjusting the encoding timing, the encoding timing at a time at which uplink traffic is absent, or adjusting, based on the DRX configuration satisfying one or more conditions for adjusting the decoding timing, the decoding timing at a time at which downlink traffic is absent.

In a fourth additional aspect, alone or in combination with one or more of the first through third aspects, the uplink traffic is uplink streaming traffic and the downlink traffic is downlink streaming traffic.

In a fifth additional aspect, alone or in combination with one or more of the first through fourth aspects, the uplink traffic is an uplink talkspurt and the downlink traffic is a downlink talkspurt.

Figure 10:
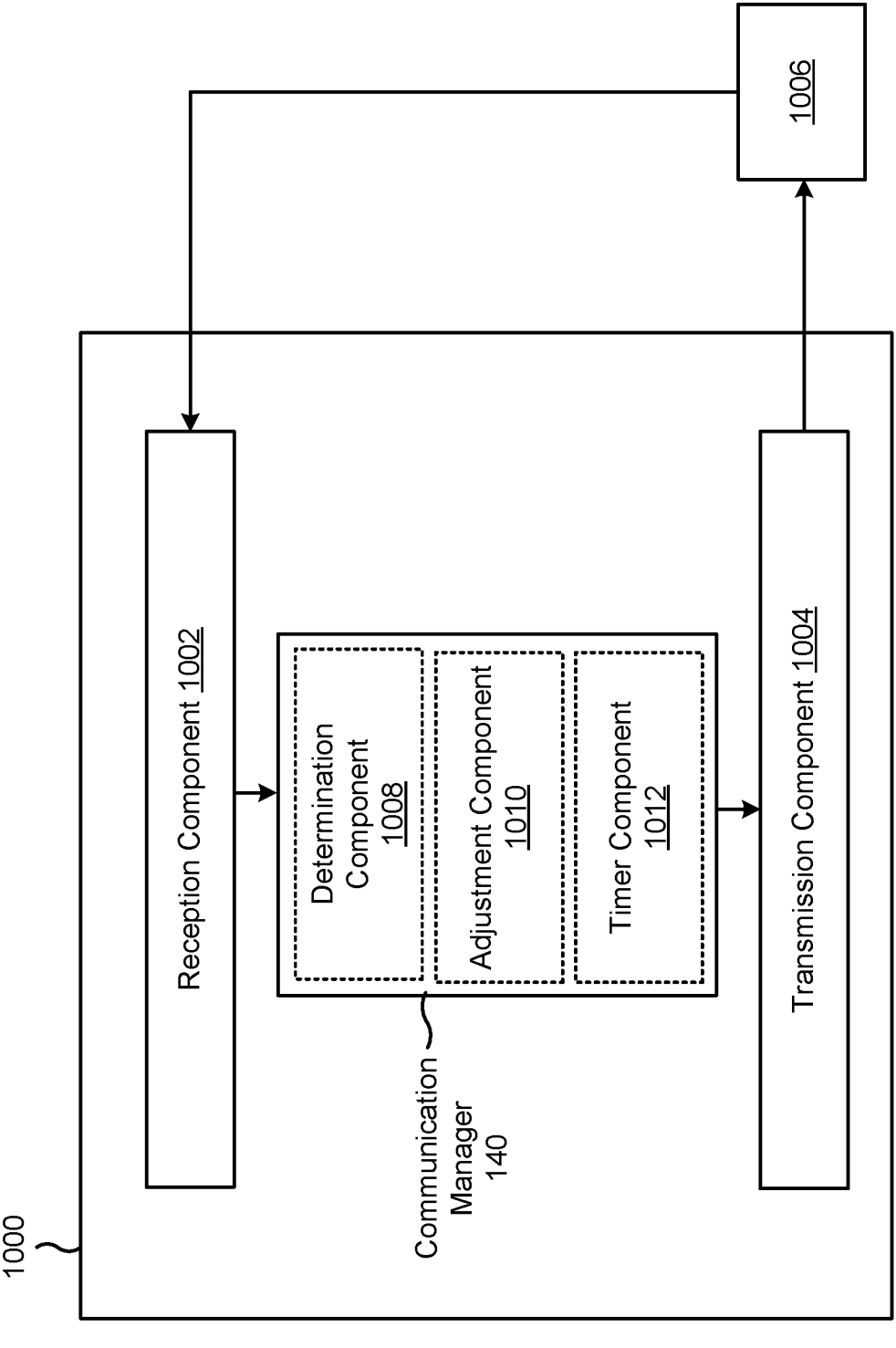
FIG. 10 is a diagram of an example apparatus for wireless communication.

In a sixth additional aspect, alone or in combination with one or more of the first through fifth aspects, the process 900 includes initiating (such as by using communication manager 140 or timer component 1012, depicted in FIG. 10), based on the DRX configuration satisfying one or more conditions for adjusting at least one of the encoding timing or the decoding timing, one or more of a timer for adjustment of the encoding timing, a timer for adjustment of the decoding timing, or a timer for adjustment of the encoding timing and the decoding timing.

In a seventh additional aspect, alone or in combination with one or more of the first through sixth aspects, based on the DRX configuration satisfying one or more conditions for adjusting the decoding timing, the decoding timing is adjusted prior to expiration of a timer for adjusting the decoding timing and at a time at which downlink traffic is absent.

In an eighth additional aspect, alone or in combination with one or more of the first through seventh aspects, the process 900 includes receiving (such as by using communication manager 140 or reception component 1002, depicted in FIG. 10) a subsequent DRX configuration for the UE prior to expiration of a timer for adjustment of the decoding timing.

In a ninth additional aspect, alone or in combination with one or more of the first through eighth aspects, the process 900 includes terminating (such as by using communication manager 140 or timer component 1012, depicted in FIG. 10) the timer for adjustment of the decoding timing and initiating (such as by using communication manager 140 or timer component 1012, depicted in FIG. 10) a timer for adjustment of the encoding timing and the decoding timing if the subsequent DRX configuration satisfies one or more conditions for adjusting the encoding timing and the decoding timing.

In a tenth additional aspect, alone or in combination with one or more of the first through ninth aspects, the process 900 includes terminating (such as by using communication manager 140 or timer component 1012, depicted in FIG. 10) the timer for adjustment of the decoding timing if the subsequent DRX configuration does not satisfy one or more conditions for adjusting the decoding timing.

In an eleventh additional aspect, alone or in combination with one or more of the first through tenth aspects, the process 900 includes reinitiating (such as by using communication manager 140 or timer component 1012, depicted in FIG. 10) the timer for adjustment of the decoding timing if the subsequent DRX configuration satisfies one or more conditions for adjusting the decoding timing.

In a twelfth additional aspect, alone or in combination with one or more of the first through eleventh aspects, based on the DRX configuration satisfying one or more conditions for adjusting the decoding timing, the decoding timing is adjusted upon expiration of a timer for adjustment of the decoding timing if downlink traffic is present for a duration of the timer.

In a thirteenth additional aspect, alone or in combination with one or more of the first through twelfth aspects, based on the DRX configuration satisfying one or more conditions for adjusting the encoding timing, the encoding timing is adjusted prior to expiration of a timer for adjusting the encoding timing and at a time at which uplink traffic is absent.

In a fourteenth additional aspect, alone or in combination with one or more of the first through thirteenth aspects, the process 900 includes receiving (such as by using communication manager 140 or reception component 1002, depicted in FIG. 10) a subsequent DRX configuration for the UE prior to expiration of a timer for adjustment of the encoding timing.

In a fifteenth additional aspect, alone or in combination with one or more of the first through fourteenth aspects, the process 900 includes terminating (such as by using communication manager 140 or timer component 1012, depicted in FIG. 10) the timer for adjustment of the encoding timing and initiating (such as by using communication manager 140 or timer component 1012, depicted in FIG. 10) a timer for adjustment of the encoding timing and the decoding timing if the subsequent DRX configuration satisfies one or more conditions for adjusting the encoding timing and the decoding timing.

In a sixteenth additional aspect, alone or in combination with one or more of the first through fifteenth aspects, the process 900 includes terminating (such as by using communication manager 140 or timer component 1012, depicted in FIG. 10) the timer for adjustment of the encoding timing if the subsequent DRX configuration does not satisfy one or more conditions for adjusting the encoding timing.

In a seventeenth additional aspect, alone or in combination with one or more of the first through sixteenth aspects, the process 900 includes reinitiating (such as by using communication manager 140 or timer component 1012, depicted in FIG. 10) the timer for adjustment of the encoding timing if the subsequent DRX configuration satisfies one or more conditions for adjusting the encoding timing.

In an eighteenth additional aspect, alone or in combination with one or more of the first through seventeenth aspects, based on the DRX configuration satisfying one or more conditions for adjusting the encoding timing, the encoding timing is adjusted upon expiration of a timer for adjustment of the encoding timing if uplink traffic is present for a duration of the timer.

In a nineteenth additional aspect, alone or in combination with one or more of the first through eighteenth aspects, based on the DRX configuration satisfying one or more conditions for adjusting the encoding timing and the decoding timing, the encoding timing and the decoding timing are adjusted prior to expiration of a timer for adjusting the encoding timing and the decoding timing and at a time at which uplink traffic and downlink traffic are absent.

In a twentieth additional aspect, alone or in combination with one or more of the first through nineteenth aspects, the process 900 includes receiving (such as by using communication manager 140 or reception component 1002, depicted in FIG. 10) a subsequent DRX configuration for the UE prior to expiration of a timer for adjustment of the encoding timing and the decoding timing.

In a twenty-first additional aspect, alone or in combination with one or more of the first through twentieth aspects, the process 900 includes terminating (such as by using communication manager 140 or timer component 1012, depicted in FIG. 10) the timer for adjustment of the encoding timing and the decoding timing and initiating (such as by using communication manager 140 or timer component 1012, depicted in FIG. 10) a timer for adjustment of the encoding timing or a timer for adjustment of the decoding timing if the subsequent DRX configuration satisfies one or more conditions for adjusting only one of the encoding timing or the decoding timing.

In a twenty-second additional aspect, alone or in combination with one or more of the first through twenty-first aspects, the process 900 includes reinitiating (such as by using communication manager 140 or timer component 1012, depicted in FIG. 10) the timer for adjustment of the encoding timing and the decoding timing if the subsequent DRX configuration satisfies one or more conditions for adjusting the encoding timing and the decoding timing.

In a twenty-third additional aspect, alone or in combination with one or more of the first through twenty-second aspects, based on the DRX configuration satisfying one or more conditions for adjusting the encoding timing and the decoding timing, the encoding timing and the decoding timing are adjusted upon expiration of a timer for adjustment of the encoding timing and the decoding timing if at least one of uplink traffic or downlink traffic is present for a duration of the timer.

In a twenty-fourth additional aspect, alone or in combination with one or more of the first through twenty-third aspects, the process 900 includes receiving (such as by using communication manager 140 or reception component 1002, depicted in FIG. 10) an indication that the DRX configuration is to be released, and refraining from adjusting the encoding timing and the decoding timing if the DRX configuration is released.

In a twenty-fifth additional aspect, alone or in combination with one or more of the first through twenty-fourth aspects, selectively adjusting at least one of the encoding timing or the decoding timing includes refraining from adjusting at least one of the encoding timing or the decoding timing if a DRX cycle length indicated by the DRX configuration is greater than a threshold.

In a twenty-sixth additional aspect, alone or in combination with one or more of the first through twenty-fifth aspects, selectively adjusting at least one of the encoding timing or the decoding timing includes refraining from adjusting at least one of the encoding timing or the decoding timing if a change of the active time, relative to a previous active time indicated by a previous DRX configuration for the UE, is less than a threshold.

In a twenty-seventh additional aspect, alone or in combination with one or more of the first through twenty-sixth aspects, the active time is indicated by the DRX configuration in conjunction with one or more of a scheduling request configuration for the UE, a semi-persistent scheduling (SPS) configuration for the UE, a configured grant configuration for the UE, or one or more configured uplink grants for the UE.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

FIG. 10 is a diagram of an example apparatus 1000 for wireless communication. The apparatus 1000 may be a UE, or a UE may include the apparatus 1000. For example, the apparatus 1000 may be an example of the UE 120 depicted and described in FIGS. 1 and 2. In some aspects, the apparatus 1000 includes a reception component 1002 and a transmission component 1004, which may be in communication with one another (for example, via one or more buses or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a determination component 1008, an adjustment component 1010, or a timer component 1012, among other examples.

In some aspects, the apparatus 1000 may be configured to perform one or more operations described herein in connection with FIGS. 5, 6A-6E, 7A-7C, and 8A-8D. Additionally, or alternatively, the apparatus 1000 may be configured to perform one or more processes described herein, such as process 900 of FIG. 9, or a combination thereof. In some aspects, the apparatus 1000 or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network entity, a DRX configuration that indicates an active time for the UE. The determination component 1008 may determine whether the DRX configuration satisfies one or more conditions for adjusting at least one of an encoding timing or a decoding timing. In other words, the determination component 1008 may determine whether at least one of encoding timing adjustment or decoding timing adjustment is triggered. The adjustment component 1010 may adjust at least one of the encoding timing or the decoding timing relative to the active time indicated by the DRX configuration. In some aspects, the adjustment component 1010 may adjust at least one of the encoding timing or the decoding timing at a particular time according to when the DRX configuration is received.

The timer component 1012 may initiate, based on the DRX configuration satisfying one or more conditions for adjusting at least one of the encoding timing or the decoding timing, one or more of a timer for adjustment of the encoding timing, a timer for adjustment of the decoding timing, or a timer for adjustment of the encoding timing and the decoding timing.

The reception component 1002 may receive a subsequent DRX configuration for the UE prior to expiration of a timer for adjustment of the decoding timing. The timer component 1012 may terminate the timer for adjustment of the decoding timing and initiating a timer for adjustment of the encoding timing and the decoding timing if the subsequent DRX configuration satisfies one or more conditions for adjusting the encoding timing and the decoding timing. The timer component 1012 may terminate the timer for adjustment of the decoding timing if the subsequent DRX configuration does not satisfy one or more conditions for adjusting the decoding timing. The timer component 1012 may reinitiate the timer for adjustment of the decoding timing if the subsequent DRX configuration satisfies one or more conditions for adjusting the decoding timing.

The reception component 1002 may receive a subsequent DRX configuration for the UE prior to expiration of a timer for adjustment of the encoding timing. The timer component 1012 may terminate the timer for adjustment of the encoding timing and initiating a timer for adjustment of the encoding timing and the decoding timing if the subsequent DRX configuration satisfies one or more conditions for adjusting the encoding timing and the decoding timing. The timer component 1012 may terminate the timer for adjustment of the encoding timing if the subsequent DRX configuration does not satisfy one or more conditions for adjusting the encoding timing. The timer component 1012 may reinitiate the timer for adjustment of the encoding timing if the subsequent DRX configuration satisfies one or more conditions for adjusting the encoding timing.

The reception component 1002 may receive a subsequent DRX configuration for the UE prior to expiration of a timer for adjustment of the encoding timing and the decoding timing. The timer component 1012 may terminate the timer for adjustment of the encoding timing and the decoding timing and initiating a timer for adjustment of the encoding timing or a timer for adjustment of the decoding timing if the subsequent DRX configuration satisfies one or more conditions for adjusting only one of the encoding timing or the decoding timing. The timer component 1012 may reinitiate the timer for adjustment of the encoding timing and the decoding timing if the subsequent DRX configuration satisfies one or more conditions for adjusting the encoding timing and the decoding timing.

The reception component 1002 may receive an indication that the DRX configuration is to be released.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), including: receiving, from a network entity, a discontinuous reception (DRX)

configuration that indicates an active time for the UE; and selectively adjusting, at a particular time according to when the DRX configuration is received, at least one of an encoding timing or a decoding timing relative to the active time indicated by the DRX configuration.

Aspect 2: The method of Aspect 1, where: the encoding timing is associated with one or more of encoding of audio or video packets or real-time transport protocol (RTP) encoding, and the decoding timing is associated with one or more of decoding of audio or video packets or RTP decoding.

Aspect 3: The method of any of Aspects 1-2, where selectively adjusting at least one of the encoding timing or the decoding timing includes: adjusting at least one of the encoding timing or the decoding timing if a DRX cycle length indicated by the DRX configuration is less than a threshold, and a change to the active time, relative to a previous active time indicated by a previous DRX configuration for the UE, is greater than a threshold.

Aspect 4: The method of any of Aspects 1-3, where selectively adjusting at least one of the encoding timing or the decoding timing includes at least one of: adjusting, based on the DRX configuration satisfying one or more conditions for adjusting the encoding timing, the encoding timing at a time at which uplink traffic is absent, or adjusting, based on the DRX configuration satisfying one or more conditions for adjusting the decoding timing, the decoding timing at a time at which downlink traffic is absent.

Aspect 5: The method of Aspect 4, where the uplink traffic is uplink streaming traffic and the downlink traffic is downlink streaming traffic.

Aspect 6: The method of any of Aspects 4-5, where the uplink traffic is an uplink talkspurt and the downlink traffic is a downlink talkspurt.

Aspect 7: The method of any of Aspects 1-6, further including: initiating, based on the DRX configuration satisfying one or more conditions for adjusting at least one of the encoding timing or the decoding timing, one or more of a timer for adjustment of the encoding timing, a timer for adjustment of the decoding timing, or a timer for adjustment of the encoding timing and the decoding timing.

Aspect 8: The method of any of Aspects 1-7, where, based on the DRX configuration satisfying one or more conditions for adjusting the decoding timing, the decoding timing is adjusted prior to expiration of a timer for adjusting the decoding timing and at a time at which downlink traffic is absent.

Aspect 9: The method of any of Aspects 1-8, further including: receiving a subsequent DRX configuration for the UE prior to expiration of a timer for adjustment of the decoding timing.

Aspect 10: The method of Aspect 9, further including: terminating the timer for adjustment of the decoding timing and initiating a timer for adjustment of the encoding timing and the decoding timing if the subsequent DRX configuration satisfies one or more conditions for adjusting the encoding timing and the decoding timing.

Aspect 11: The method of any of Aspects 9-10, further including: terminating the timer for adjustment of the decoding timing if the subsequent DRX configuration does not satisfy one or more conditions for adjusting the decoding timing.

Aspect 12: The method of any of Aspects 9-11, further including: reinitiating the timer for adjustment of the decoding timing if the subsequent DRX configuration satisfies one or more conditions for adjusting the decoding timing.

Aspect 13: The method of any of Aspects 1-12, where, based on the DRX configuration satisfying one or more conditions for adjusting the decoding timing, the decoding timing is adjusted upon expiration of a timer for adjustment of the decoding timing if downlink traffic is present for a duration of the timer.

Aspect 14: The method of any of Aspects 1-13, where, based on the DRX configuration satisfying one or more conditions for adjusting the encoding timing, the encoding timing is adjusted prior to expiration of a timer for adjusting the encoding timing and at a time at which uplink traffic is absent.

Aspect 15: The method of any of Aspects 1-14, further including: receiving a subsequent DRX configuration for the UE prior to expiration of a timer for adjustment of the encoding timing.

Aspect 16: The method of Aspect 15, further including: terminating the timer for adjustment of the encoding timing and initiating a timer for adjustment of the encoding timing and the decoding timing if the subsequent DRX configuration satisfies one or more conditions for adjusting the encoding timing and the decoding timing.

Aspect 17: The method of any of Aspects 15-16, further including: terminating the timer for adjustment of the encoding timing if the subsequent DRX configuration does not satisfy one or more conditions for adjusting the encoding timing.

Aspect 18: The method of any of Aspects 15-17, further including: reinitiating the timer for adjustment of the encoding timing if the subsequent DRX configuration satisfies one or more conditions for adjusting the encoding timing.

Aspect 19: The method of any of Aspects 1-18, where, based on the DRX configuration satisfying one or more conditions for adjusting the encoding timing, the encoding timing is adjusted upon expiration of a timer for adjustment of the encoding timing if uplink traffic is present for a duration of the timer.

Aspect 20: The method of any of Aspects 1-19, where, based on the DRX configuration satisfying one or more conditions for adjusting the encoding timing and the decoding timing, the encoding timing and the decoding timing are adjusted prior to expiration of a timer for adjusting the encoding timing and the decoding timing and at a time at which uplink traffic and downlink traffic are absent.

Aspect 21: The method of any of Aspects 1-20, further including: receiving a subsequent DRX configuration for the UE prior to expiration of a timer for adjustment of the encoding timing and the decoding timing.

Aspect 22: The method of Aspect 21, further including: terminating the timer for adjustment of the encoding timing and the decoding timing and initiating a timer for adjustment of the encoding timing or a timer for adjustment of the decoding timing if the subsequent DRX configuration satisfies one or more conditions for adjusting only one of the encoding timing or the decoding timing.

Aspect 23: The method of any of Aspects 21-22, further including: reinitiating the timer for adjustment of the encoding timing and the decoding timing if the subsequent DRX configuration satisfies one or more conditions for adjusting the encoding timing and the decoding timing.

Aspect 24: The method of any of Aspects 1-23, where, based on the DRX configuration satisfying one or more conditions for adjusting the encoding timing and the decoding timing, the encoding timing and the decoding timing are adjusted upon expiration of a timer for adjustment of the encoding timing and the decoding timing if at least one of uplink traffic or downlink traffic is present for a duration of the timer.

Aspect 25: The method of any of Aspects 1-24, further including: receiving an indication that the DRX configuration is to be released; and refraining from adjusting the encoding timing and the decoding timing if the DRX configuration is released.

Aspect 26: The method of any of Aspects 1-25, where selectively adjusting at least one of the encoding timing or the decoding timing includes: refraining from adjusting at least one of the encoding timing or the decoding timing if a DRX cycle length indicated by the DRX configuration is greater than a threshold.

Aspect 27: The method of any of Aspects 1-26, where selectively adjusting at least one of the encoding timing or the decoding timing includes: refraining from adjusting at least one of the encoding timing or the decoding timing if a change of the active time, relative to a previous active time indicated by a previous DRX configuration for the UE, is less than a threshold.

Aspect 28: The method of any of Aspects 1-27, where the active time is indicated by the DRX configuration in conjunction with one or more of a scheduling request configuration for the UE, a semi-persistent scheduling (SPS) configuration for the UE, a configured grant configuration for the UE, or one or more configured uplink grants for the UE.

Aspect 29: An apparatus for wireless communication at a device, including a processor; memory coupled with the processor; and instructions stored in the memory and executable by the processor to cause the apparatus to perform the method of one or more of Aspects 1-28.

Aspect 30: A device for wireless communication, including a memory and one or more processors coupled to the memory, the one or more processors configured to perform the method of one or more of Aspects 1-28.

Aspect 31: An apparatus for wireless communication, including at least one means for performing the method of one or more of Aspects 1-28.

Aspect 32: A non-transitory computer-readable medium storing code for wireless communication, the code including instructions executable by a processor to perform the method of one or more of Aspects 1-28.

Aspect 33: A non-transitory computer-readable medium storing a set of instructions for wireless communication, the set of instructions including one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE), comprising:
a processing system that includes one or more processors and one or more memories that store code and are coupled with the one or more processors, the processing system configured to cause the UE to:
   receive, from a network entity, a discontinuous reception (DRX) configuration that indicates an active time for the UE; and
   selectively adjust, at a particular time according to when the DRX configuration is received, at least one of an encoding timing or a decoding timing relative to the active time indicated by the DRX configuration,
      wherein the processing system, to selectively adjust the at least one of the encoding timing or the decoding timing, is configured to cause the UE to:
      adjust, based on the DRX configuration satisfying one or more first conditions for adjusting the encoding timing, the encoding timing either:
         prior to expiration of a timer and at a first time at which uplink traffic is absent, or
         upon expiration of the timer if uplink traffic is present for a duration of the timer;
      adjust, based on the DRX configuration satisfying one or more second conditions for adjusting the decoding timing, the decoding timing either:
         prior to expiration of the timer and at a second time at which downlink traffic is absent, or
         upon expiration of the timer if downlink traffic is present for the duration of the timer;
      adjust, based on the DRX configuration satisfying one or more third conditions for adjusting the encoding time and the decoding timing, the encoding time and the decoding timing either:
         prior to expiration of the timer and at a third time at which uplink traffic and downlink traffic are absent, or
         upon expiration of the timer if at least one of uplink traffic or downlink traffic is present for the duration of the timer; or
      refrain from adjusting the encoding timing and the decoding timing if the DRX configuration is released.

2. The UE of claim 1, wherein the processing system, to selectively adjust the at least one of the encoding timing or the decoding timing, is configured to cause the UE to:
   adjust the at least one of the encoding timing or the decoding timing if a DRX cycle length indicated by the DRX configuration is less than a threshold, and a change to the active time, relative to a previous active time indicated by a previous DRX configuration for the UE, is greater than a threshold.

3. The UE of claim 1, wherein the uplink traffic is uplink streaming traffic and the downlink traffic is downlink streaming traffic, or
   wherein the uplink traffic is an uplink talkspurt and the downlink traffic is a downlink talkspurt.

4. The UE of claim 1, wherein the processing system is further configured to cause the UE to:

initiate, based on the DRX configuration satisfying one or more of the one or more first conditions, the one or more second conditions, or the one or more third conditions the timer.

5. The UE of claim 1, wherein the processing system, to selectively adjust the at least one of the encoding timing or the decoding timing, is configured to cause the UE to:

refrain from adjusting the at least one of the encoding timing or the decoding timing if a DRX cycle length indicated by the DRX configuration is greater than a threshold, or if a change of the active time, relative to a previous active time indicated by a previous DRX configuration for the UE, is less than a threshold.

6. The UE of claim 1, wherein the active time is indicated by the DRX configuration in conjunction with one or more of a scheduling request configuration for the UE, a semi-persistent scheduling (SPS) configuration for the UE, a configured grant configuration for the UE, or one or more configured uplink grants for the UE.

7. The UE of claim 1, wherein the processing system is further configured to cause the UE to:

initiate the timer based at least in part on a reception of the DRX configuration.

8. The UE of claim 7, wherein the processing system is further configured to cause the UE to:

receive another DRX configuration prior to expiration of the timer; and re-initiate the timer based at least in part on a reception of the other DRX configuration prior to expiration of the timer.

9. The UE of claim 8, wherein the processing system, to adjust the decoding timing upon expiration of the timer if downlink traffic is present for the duration of the timer, is configured to cause the UE to:

adjust the decoding timing upon expiration of the timer if downlink traffic is present for the duration of the timer after re-initiation of the timer.

10. The UE of claim 8, wherein the other DRX configuration triggers encoding and decoding timing adjustment; and wherein the processing system is further configured to cause the UE to:

terminate the timer; and initiate another timer.

11. The UE of claim 10, wherein the processing system, to selectively adjust the at least one of the encoding timing or the decoding timing, is configured to cause the UE to:

adjust the encoding timing and the decoding timing upon expiration of the other timer if at least one of uplink traffic or downlink traffic is present for a duration of the other timer.

12. The UE of claim 10, wherein the processing system, to selectively adjust the at least one of the encoding timing or the decoding timing, is configured to cause the UE to:

adjust the encoding timing and the decoding timing prior to expiration of the other timer and at a fourth time at which uplink traffic and downlink traffic are absent.

13. The UE of claim 7, wherein the processing system is further configured to cause the UE to:

receive another DRX configuration prior to expiration of the timer; and terminate the timer and refrain from adjusting the decoding timing based at least in part on a reception of the other DRX configuration prior to expiration of the timer.

14. The UE of claim 1, wherein the processing system, to selectively adjust the at least one of the encoding timing or the decoding timing, is configured to cause the UE to:

adjust the decoding timing during a downlink silence period based at least in part on a reception of the DRX configuration during the downlink silence period.

15. The UE of claim 1, wherein the processing system, to selectively adjust the at least one of the encoding timing or the decoding timing, is configured to cause the UE to:

adjust the encoding timing during an uplink silence period based at least in part on a reception of the DRX configuration during the uplink silence period.

16. A method of wireless communication performed by an apparatus of a user equipment (UE), comprising:

receiving, from a network entity, a discontinuous reception (DRX) configuration that indicates an active time for the UE; and selectively adjusting, at a particular time according to when the DRX configuration is received, at least one of an encoding timing or a decoding timing relative to the active time indicated by the DRX configuration, wherein selectively adjusting the at least one of the encoding timing or the decoding timing comprises:

adjusting, based on the DRX configuration satisfying one or more first conditions for adjusting the encoding timing, the encoding timing either:

prior to expiration of a timer and at a first time at which uplink traffic is absent, or upon expiration of the timer if uplink traffic is present for a duration of the timer;

adjusting, based on the DRX configuration satisfying one or more second conditions for adjusting the decoding timing, the decoding timing either:

prior to expiration of the timer and at a second time at which downlink traffic is absent, or upon expiration of the timer if downlink traffic is present for the duration of the timer;

adjusting, based on the DRX configuration satisfying one or more third conditions for adjusting the encoding time and the decoding timing, the encoding time and the decoding timing either:

prior to expiration of the timer and at a third time at which uplink traffic and downlink traffic are absent, or upon expiration of the timer if at least one of uplink traffic or downlink traffic is present for the duration of the timer; or refraining from adjusting the encoding timing and the decoding timing if the DRX configuration is released.

17. The method of claim 16, wherein selectively adjusting the at least one of the encoding timing or the decoding timing comprises:

adjusting the at least one of the encoding timing or the decoding timing if a DRX cycle length indicated by the DRX configuration is less than a threshold, and a change to the active time, relative to a previous active time indicated by a previous DRX configuration for the UE, is greater than a threshold.

18. The method of claim 16, wherein the uplink traffic is uplink streaming traffic and the downlink traffic is downlink streaming traffic, or wherein the uplink traffic is an uplink talkspurt and the downlink traffic is a downlink talkspurt.

19. The method of claim 16, further comprising:

initiating, based on the DRX configuration satisfying one or more of the one or more first conditions, the one or more second conditions, or the one or more third conditions the timer.

20. The method of claim 16, wherein selectively adjusting the at least one of the encoding timing or the decoding timing comprises:

refraining from adjusting the at least one of the encoding timing or the decoding timing if a DRX cycle length indicated by the DRX configuration is greater than a threshold, or if a change of the active time, relative to a previous active time indicated by a previous DRX configuration for the UE, is less than a threshold.

21. The method of claim 16, wherein the active time is indicated by the DRX configuration in conjunction with one or more of a scheduling request configuration for the UE, a semi-persistent scheduling (SPS) configuration for the UE, a configured grant configuration for the UE, or one or more configured uplink grants for the UE.

22. The method of claim 16, further comprising:

initiating the timer based at least in part on a reception of the DRX configuration.

23. The method of claim 22, further comprising:

receiving another DRX configuration prior to expiration of the timer; and re-initiating the timer based at least in part on receiving the other DRX configuration prior to expiration of the timer.

24. The method of claim 23, wherein adjusting the decoding timing upon expiration of the timer if downlink traffic is present for the duration of the timer, is configured to cause the UE to:

adjusting the decoding timing upon expiration of the timer if downlink traffic is present for the duration of the timer after re-initiating the timer.

25. The method of claim 23, wherein the other DRX configuration triggers encoding and decoding timing adjustment; and wherein the method further comprises:

terminating the timer; and initiating another timer.

26. The method of claim 25, wherein selectively adjusting the at least one of the encoding timing or the decoding timing comprises:

adjusting the encoding timing and the decoding timing upon expiration of the other timer if at least one of uplink traffic or downlink traffic is present for a duration of the other timer.

27. The method of claim 25, wherein selectively adjusting the at least one of the encoding timing or the decoding timing comprises:

adjusting the encoding timing and the decoding timing prior to expiration of the other timer and at a fourth time at which uplink traffic and downlink traffic are absent.

28. The method of claim 22, further comprising:

receiving another DRX configuration prior to expiration of the timer; and terminating the timer and refraining from adjusting the decoding timing based at least in part on receiving the other DRX configuration prior to expiration of the timer.

29. The method of claim 16, wherein selectively adjusting the at least one of the encoding timing or the decoding timing comprises:

adjusting the decoding timing during a downlink silence period based at least in part on receiving the DRX configuration during the downlink silence period.

30. The method of claim 16, wherein selectively adjusting the at least one of the encoding timing or the decoding timing comprises:

adjusting the encoding timing during an uplink silence period based at least in part on receiving the DRX configuration during the uplink silence period.

* * * * *